United States Patent
Muranaka

(10) Patent No.: US 11,717,890 B2
(45) Date of Patent: Aug. 8, 2023

(54) ADDITIVE MANUFACTURING APPARATUS

(71) Applicant: Sodick Co., Ltd., Kanagawa (JP)

(72) Inventor: Katsutaka Muranaka, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 17/750,388

(22) Filed: May 22, 2022

(65) Prior Publication Data

US 2023/0013567 A1    Jan. 19, 2023

(30) Foreign Application Priority Data

Jul. 14, 2021   (JP) ................. 2021-116288

(51) Int. Cl.
*B22F 10/20*   (2021.01)
*B22F 3/10*    (2006.01)
*B22F 12/50*   (2021.01)
*B22F 12/41*   (2021.01)
*B33Y 30/00*   (2015.01)
*B22F 12/70*   (2021.01)
*B22F 12/49*   (2021.01)

(52) U.S. Cl.
CPC ............ *B22F 10/20* (2021.01); *B22F 3/1003* (2013.01); *B22F 12/41* (2021.01); *B22F 12/50* (2021.01); *B22F 12/70* (2021.01); *B33Y 30/00* (2014.12); *B22F 12/49* (2021.01); *B22F 2201/10* (2013.01)

(58) Field of Classification Search
None
See application file for complete search history.

(56) References Cited

U.S. PATENT DOCUMENTS

| | | | |
|---|---|---|---|
| 10,850,327 B2 | 12/2020 | Riva et al. | |
| 10,987,867 B2 | 4/2021 | Bechmann et al. | |
| 11,084,209 B2 | 8/2021 | Zaiss | |
| 2017/0259339 A1* | 9/2017 | Riva | B22F 10/32 |
| 2018/0133967 A1* | 5/2018 | Bechmann | B33Y 30/00 |
| 2020/0262140 A1* | 8/2020 | Zaiss | B33Y 40/00 |
| 2022/0219289 A1* | 7/2022 | Griesser | B24C 1/08 |

FOREIGN PATENT DOCUMENTS

| | | | | |
|---|---|---|---|---|
| CN | 210146989 | | 3/2020 | |
| DE | 102019004122 A1 | * | 12/2020 | ............ B22F 10/20 |
| JP | 5982046 | | 8/2016 | |
| JP | 2017048408 A | * | 3/2017 | |

OTHER PUBLICATIONS

Machine Translation of JP-2017048408-A (Year: 2017).*
Machine Translation of DE-102019004122-A1 (Year: 2020).*

* cited by examiner

*Primary Examiner* — Kevin E Yoon
*Assistant Examiner* — Ryan L Heckman
(74) *Attorney, Agent, or Firm* — JCIPRNET

(57) ABSTRACT

An additive manufacturing apparatus includes: a chamber, including a front plate; a door, provided at an opening of the front plate; an irradiator; a gas supplier, supplying an inert gas to the chamber; and a gas discharger, discharging the inert gas from the chamber. The gas supplier includes a middle nozzle and a lower nozzle. The middle nozzle is provided so as to cross the opening when the door is closed, has one end swingably supported on the front plate, and swings independently of opening and closing of the door.

14 Claims, 16 Drawing Sheets

ND MANUFACTURING APPARATUS

ADDITIVE MANUFACTURING APPARATUS

CROSS-REFERENCE TO RELATED APPLICATIONS

This application claims the priority benefit of Japan Application No. 2021-116288, filed on Jul. 14, 2021. The entirety of the above-mentioned patent application is hereby incorporated by reference herein and made a part of this specification.

BACKGROUND

Technical Field

The disclosure relates to an additive manufacturing apparatus.

Related Art

There are various methods for additive manufacturing. For example, in an additive manufacturing apparatus that performs powder bed fusion, a material layer is formed in a build region being a region for forming a desired three-dimensional object, and the material layer is irradiated with a laser beam or an electron beam to form a solidified layer. Then, the formation of the material layer and the formation of the solidified layer are alternately repeated, and a three-dimensional object being a laminate of a plurality of solidified layers is formed.

In general, in the additive manufacturing apparatus, in order to prevent deterioration of the material layer and the solidified layer, a chamber covering the build region is filled with an inert gas during manufacturing. When the laser beam or the electron beam is irradiated to form the solidified layer, smoke referred to as fume occurs from an irradiation position. Since a fume may attenuate the laser beam or the electron beam or may contaminate an optical component, there is a possibility that quality of the three-dimensional object may be affected. Hence, the additive manufacturing apparatus is configured to supply the inert gas having a predetermined concentration into the chamber and to discharge the inert gas containing the fume from the chamber.

An opening used for taking out the three-dimensional object is formed in the chamber, and the opening is provided with an openable and closable door. Hereinafter, in the chamber, a side on which the opening is formed, that is, a side on which the door is provided, is taken as a front side, a direction facing the front side is taken as a back side, and the left and right directions from the front side toward the back side are respectively taken as a left side and a right side. A space inside the chamber is classified as upper space, middle space, and lower space in order from a relatively high position.

The fume occurs in the build region. Hence, it is desired to generate a stream of the inert gas directly above the build region, that is, in the lower space inside the chamber, and remove the fume.

In an additive manufacturing apparatus disclosed in Japanese Patent No. 5982046 B1, an inert gas is mainly supplied from a supply port provided in a lower part of a left side plate of a chamber and a supply port provided on a right side surface of a recoater head moving on a build region. In the additive manufacturing apparatus, the inert gas is mainly discharged from a discharge port provided in a lower part of a right side plate of the chamber and a discharge port provided on a left side surface of the recoater head. According to such a configuration, a stream of the inert gas flowing from left to right can be formed above the build region, and the fume rides on the stream and is discharged outside the chamber.

In the case of only generating a stream directly above the build region, the fume may stay in the chamber. U.S. Pat. No. 10,987,867 B2 discloses an additive manufacturing apparatus in which a stream of an inert gas is generated in the upper space, the middle space, and the lower space inside a chamber.

Because of design restrictions or the like, it may be difficult to form a stream in a left-right direction. In some cases, a stream in a front-back direction may be able to more suitably remove fumes than a stream in the left-right direction. In generating the stream in the front-back direction, it is conceivable to provide a gas supplier having an inert gas supply port directly on a door. However, since the gas supplier moves as the door opens and closes, there is a risk that a material accumulating on the gas supplier may fall out of the apparatus.

SUMMARY

According to the disclosure, an additive manufacturing apparatus is provided, including: a chamber, including a front plate on which an opening is formed, and covering a build region being a region where a desired three-dimensional object is formed; a door, provided at the opening and configured to be openable and closable; an irradiator, provided above the chamber and irradiating a material layer formed in the build region with a laser beam or an electron beam to form a solidified layer; a gas supplier, supplying an inert gas to the chamber; and a gas discharger, discharging the inert gas from the chamber. The gas supplier includes: a middle nozzle, provided so as to cross the opening when the door is closed, and in which a middle blowout port that blows out the inert gas is formed; and a lower nozzle, provided below the middle nozzle on a side of the front plate inside the chamber, and in which a lower blowout port that blows out the inert gas is formed. The middle nozzle has one end swingably supported on the front plate, and swings independently of opening and closing of the door.

DESCRIPTION OF THE EMBODIMENTS

The disclosure provides an additive manufacturing apparatus which is configured to generate a stream of an inert gas flowing from the front to the back at least in a middle space and a lower space of a chamber and prevent retention of fumes and in which leakage of a material out of the apparatus is less likely to occur.

The additive manufacturing apparatus of the disclosure includes at least the middle nozzle and the lower nozzle as the gas supplier that supplies the inert gas to the chamber. The middle nozzle is provided so as to cross the opening of the front plate when the door is closed. The lower nozzle is provided below the middle nozzle on a side of the front plate inside the chamber. Accordingly, the stream of the inert gas flowing from the front to the back can be formed at least in the lower space and the middle space of the chamber, retention of fumes can be prevented and the fumes can be relatively efficiently removed. The middle nozzle has one end swingably supported on the front plate, and swings independently of the door. Accordingly, at the time of setup work or maintenance in the chamber, or takeout of a three-dimensional object, the work can be performed without being hindered by the middle nozzle. Since the middle nozzle does not substantially swing in the case of only opening the door, a material accumulating on the middle nozzle can be prevented from falling out of the apparatus and leaking out.

Hereinafter, an embodiment of the disclosure will be described using drawings. In each drawing, pipes or hoses connecting each part, fastening members such as screws or bolts, and other constituent members unnecessary for the description of the disclosure may be omitted as appropriate. The various modifications described below can be implemented in any combination. As described above, unless otherwise specified, directions are defined with an opening side of a chamber as the front side.

Figure 1:
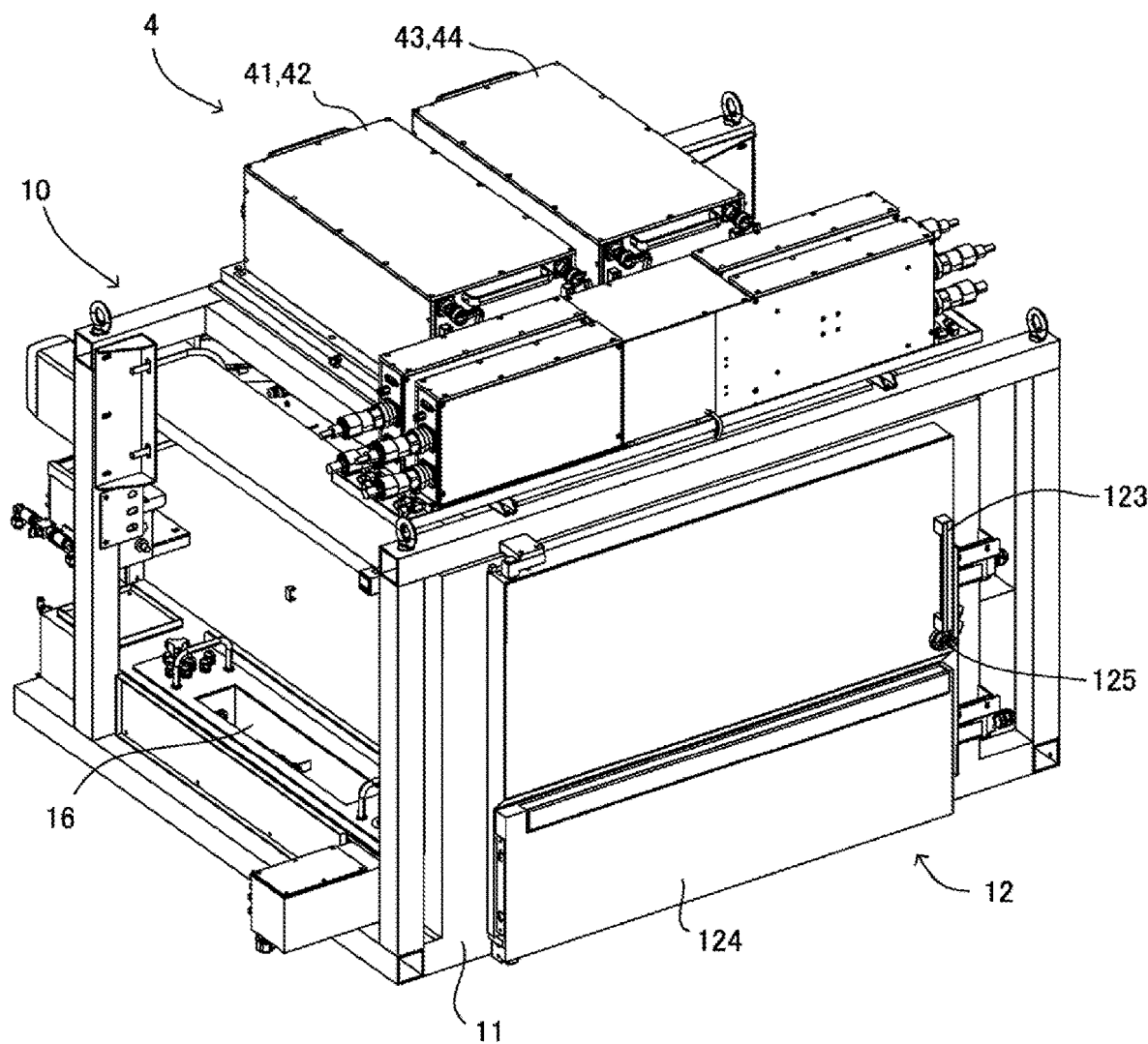
FIG. 1 is an external view of a chamber and an irradiator.
Figure 2:
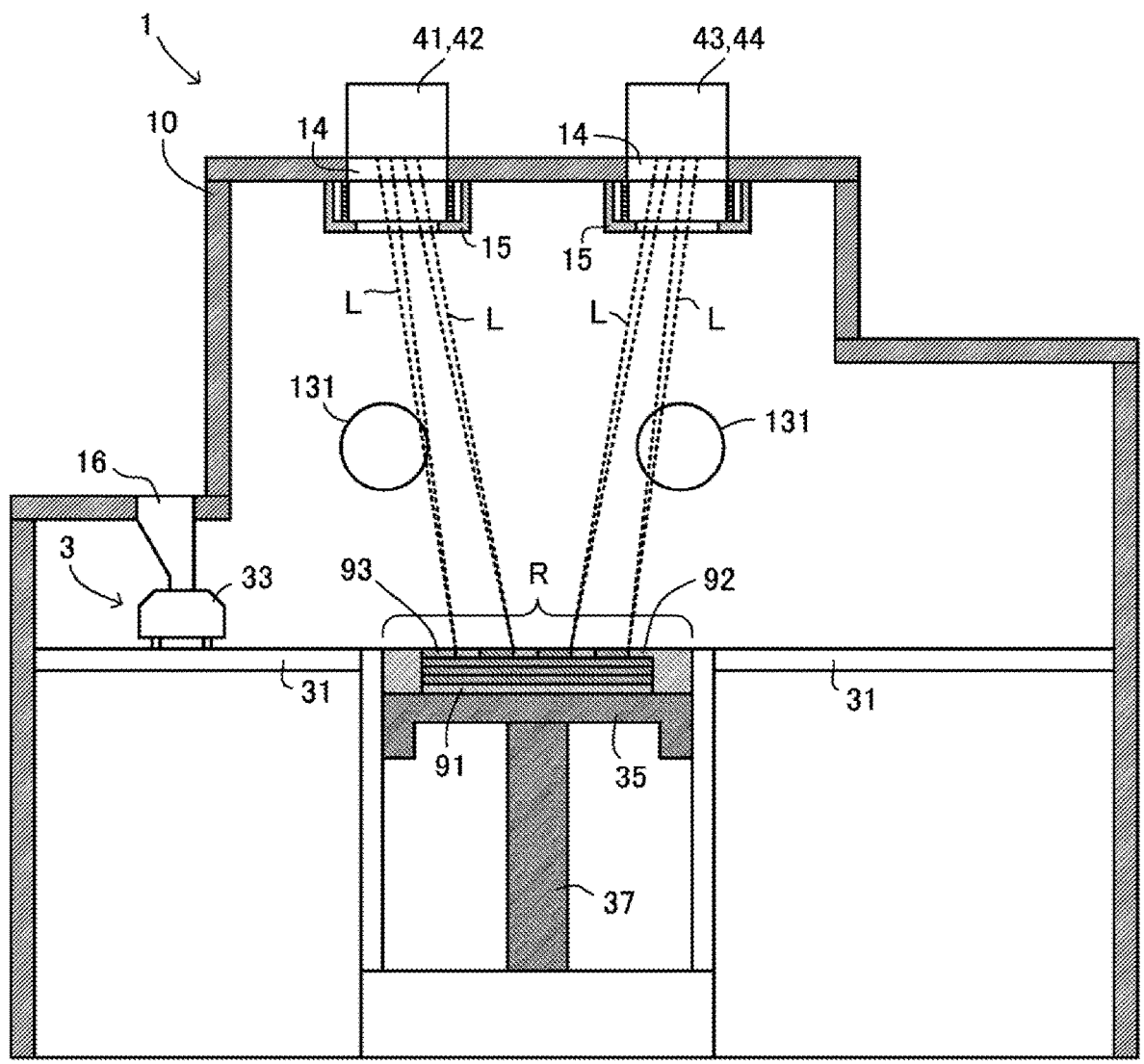
FIG. 2 is a front sectional view of an additive manufacturing apparatus.
Figure 3:
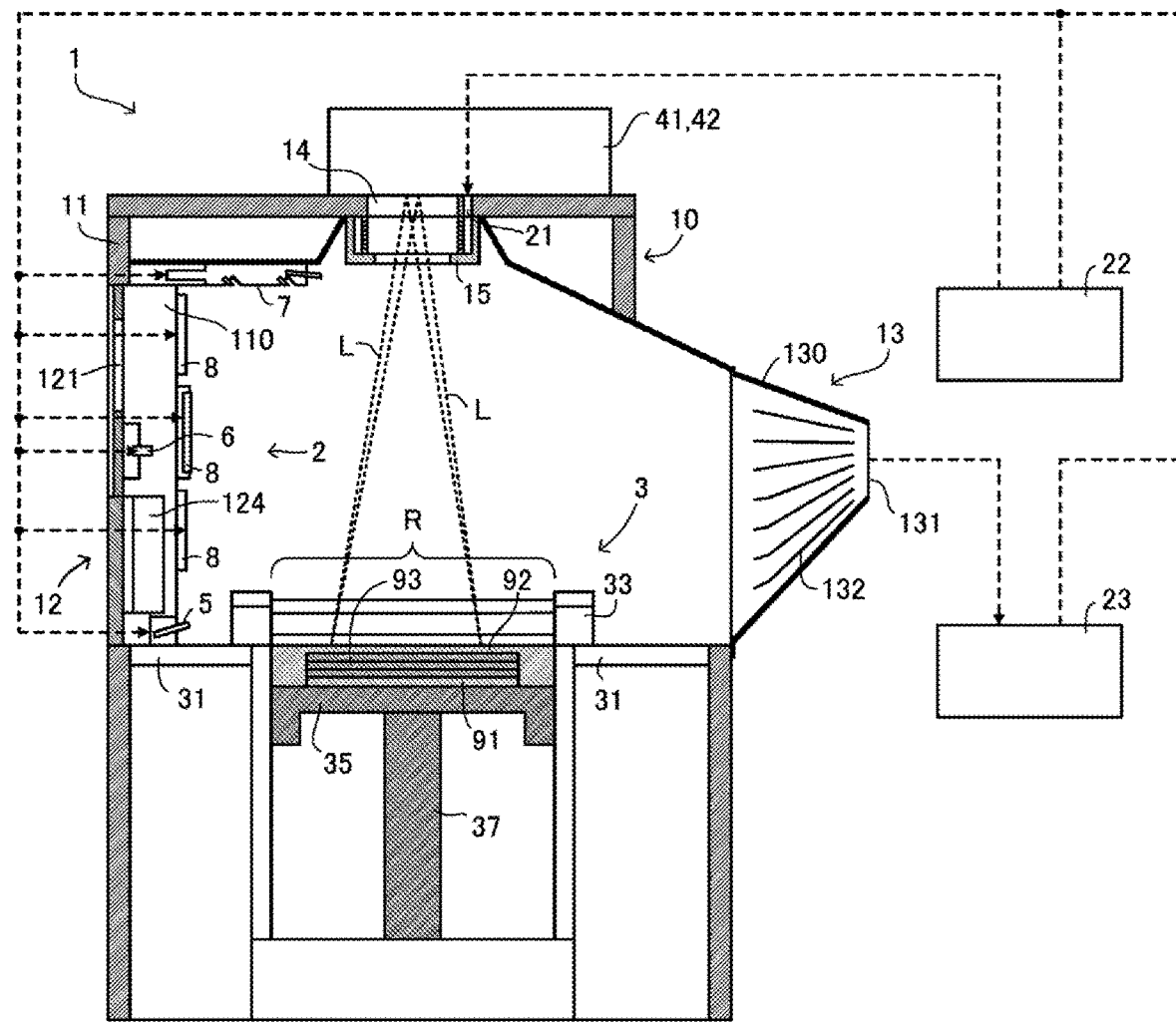
FIG. 3 is a side sectional view of the additive manufacturing apparatus.

As shown in FIG. 1 to FIG. 3, an additive manufacturing apparatus 1 of the present embodiment includes a chamber 10, a door 12, a material layer forming device 3, an irradiator 4, a gas supplier 2, a gas discharger 13, an inert gas supply device 22, and a fume collector 23. The additive manufacturing apparatus 1 alternately repeats formation of a material layer 92 by the material layer forming device 3 and formation of a solidified layer 93 by the irradiator 4 to manufacture a desired three-dimensional object.

The chamber 10 is configured to be substantially sealed and covers a build region R being a region where the desired three-dimensional object is formed. The chamber 10 is configured to include a front plate 11 on which an opening 111 is formed. The front plate 11 is configured to include a frame 110. In the present embodiment, the frame 110 is connected to the inert gas supply device 22 and the fume collector 23 via a pipe, and an inert gas circulates inside the frame 110. Each device of the gas supplier 2 is attached to the frame 110, and introduction ports for the inert gas are formed at attachment positions. The inert gas circulates inside the frame 110 is sent to each device of the gas supplier 2 via each introduction port.

The opening 111 is provided with the door 12 configured to be openable and closable. The door 12 of the present embodiment has an observation window 121 in an upper part and a glove box 124 in a lower part. The observation window 121 is made of a material that attenuates scattered light of a laser beam L or an electron beam and has transparency allowing the inside of the chamber 10 to be visually recognized. An operator is able to perform work inside the chamber 10 through a glove of the glove box 124 with the door 12 closed. A gripping member 123 is a handle for opening and closing the door 12. A lock mechanism 125 locks and unlocks the door 12. In the present embodiment, the door 12 has a left end hinged to the front plate 11 and is configured to swing to open and close. However, another opening and closing mechanism may be adopted. For example, the door 12 may be configured to slide up and down or from side to side to open and close.

The inert gas supply device 22 supplies the inert gas to the gas supplier 2 during manufacturing, that is, a period from the start to the completion of manufacture of the desired three-dimensional object. The gas supplier 2 supplies the chamber 10 with the inert gas, and the chamber 10 is filled with the inert gas having a predetermined concentration. The inert gas supply device 22 is, for example, an inert gas generator that generates an inert gas from the air or a gas cylinder in which an inert gas is stored. The inert gas containing a fume generated during the formation of the solidified layer 93 is discharged from the chamber 10 via the gas discharger 13. Preferably, the inert gas discharged from the chamber 10 via the gas discharger 13 has the fume removed therefrom by the fume collector 23 and is then returned into the chamber 10 via the gas supplier 2. The fume collector 23 includes, for example, an electrostatic precipitator or a filter. The inert gas is a gas that does not substantially react with the material layer 92 or the solidified layer 93, and is appropriately selected from nitrogen gas, argon gas, helium gas and the like depending on the type of the material.

Figure 4:
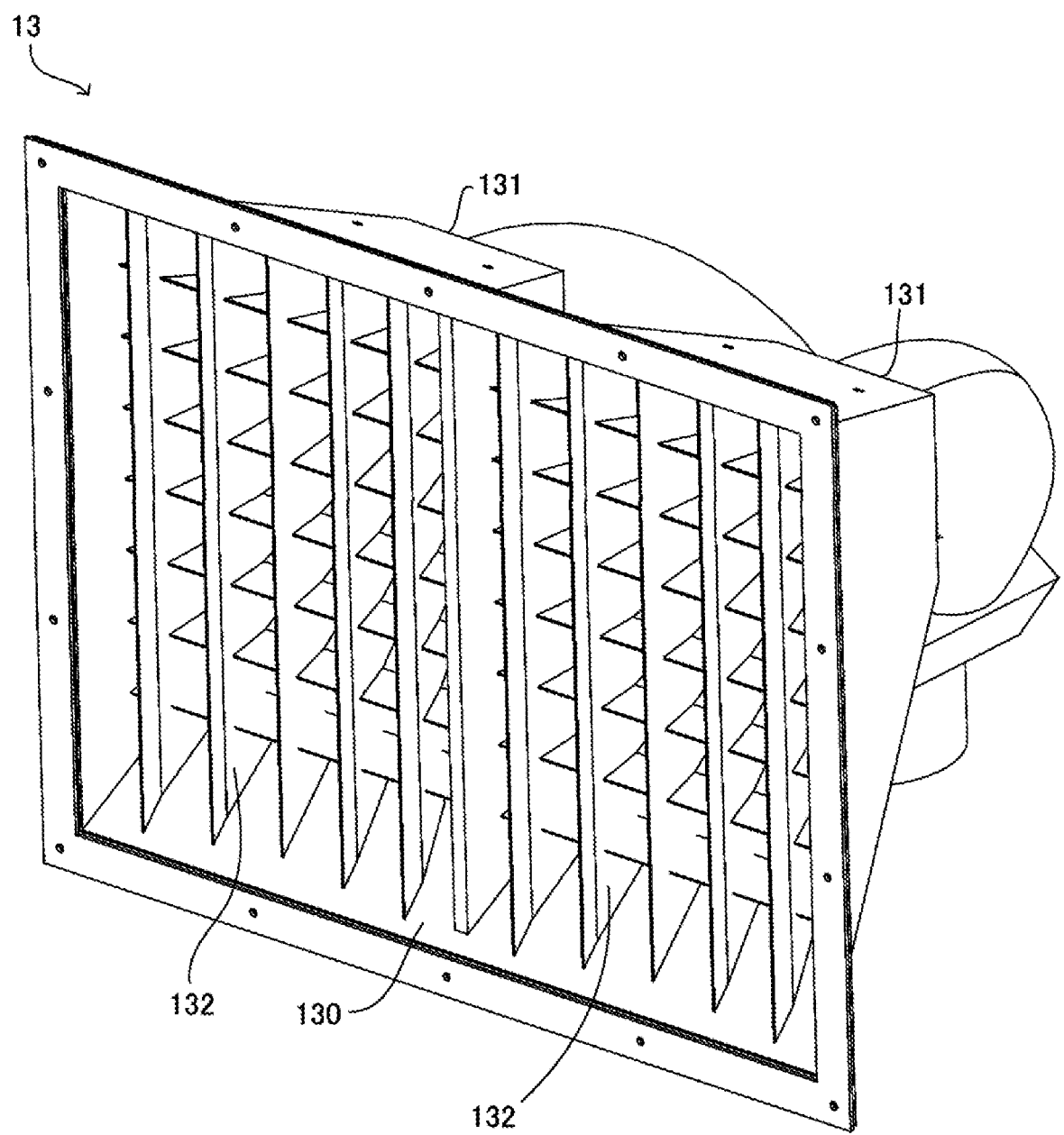
FIG. 4 is a perspective view of a gas discharger.

The gas discharger 13 discharges the inert gas from the chamber 10. The gas discharger 13 of the present embodiment constitutes at least a portion of a back plate of the chamber 10. As shown in FIG. 4, the gas discharger 13 includes an exhaust duct 130 in which a discharge port 131 is formed, and a current plate 132 provided in a middle position in the chamber 10, that is, at substantially the same height as the opening 111. The inert gas containing the fume is rectified by the current plate 132 having a lattice shape and installed in front of the discharge port 131, and is discharged out of the chamber 10 via the discharge port 131. As described above, the inert gas discharged from the discharge port 131 is sent to the fume collector 23.

The material layer forming device 3 is provided inside the chamber 10 and forms the material layer 92 having a predetermined thickness. The material layer forming device 3 includes a base 31 having the build region R and a recorder head 33 disposed on the base 31. The recoater head 33 is configured to be horizontally movable by a recoater head drive device (not shown) having an arbitrary actuator. A build table 35 is disposed in the build region R. The build table 35 is configured to be vertically movable by a build table drive device 37 having any actuator. A base plate 91 may be placed on the build table 35 at the time of manufacturing. In this case, the material layer 92 as a first layer is formed on the base plate 91.

Figure 5:
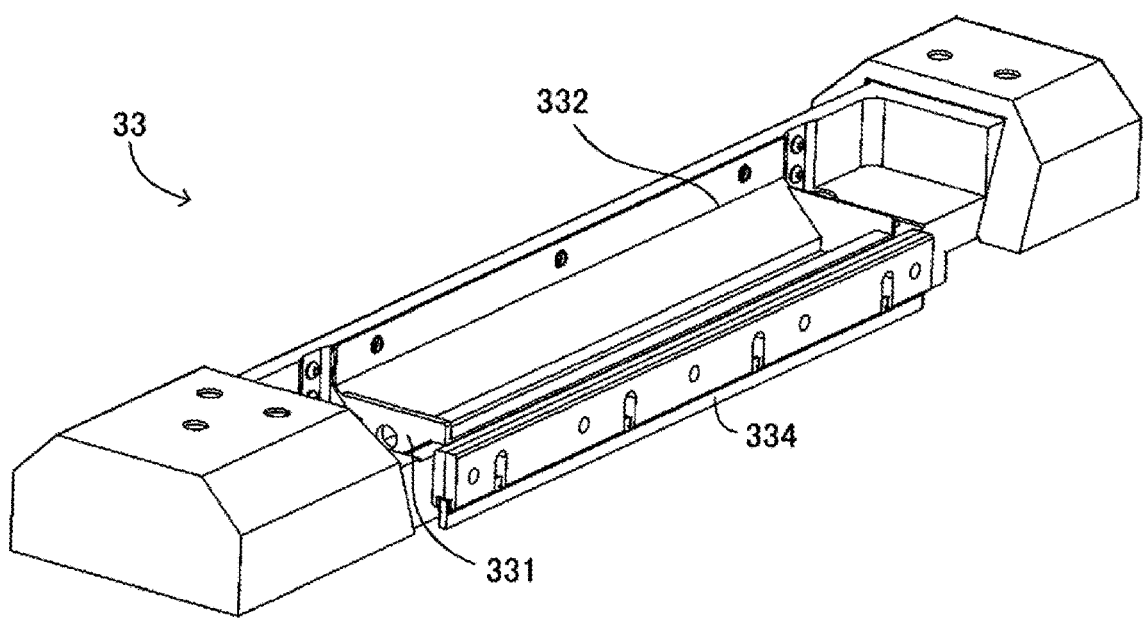
FIG. 5 is a perspective view of a recoater head.
Figure 6:
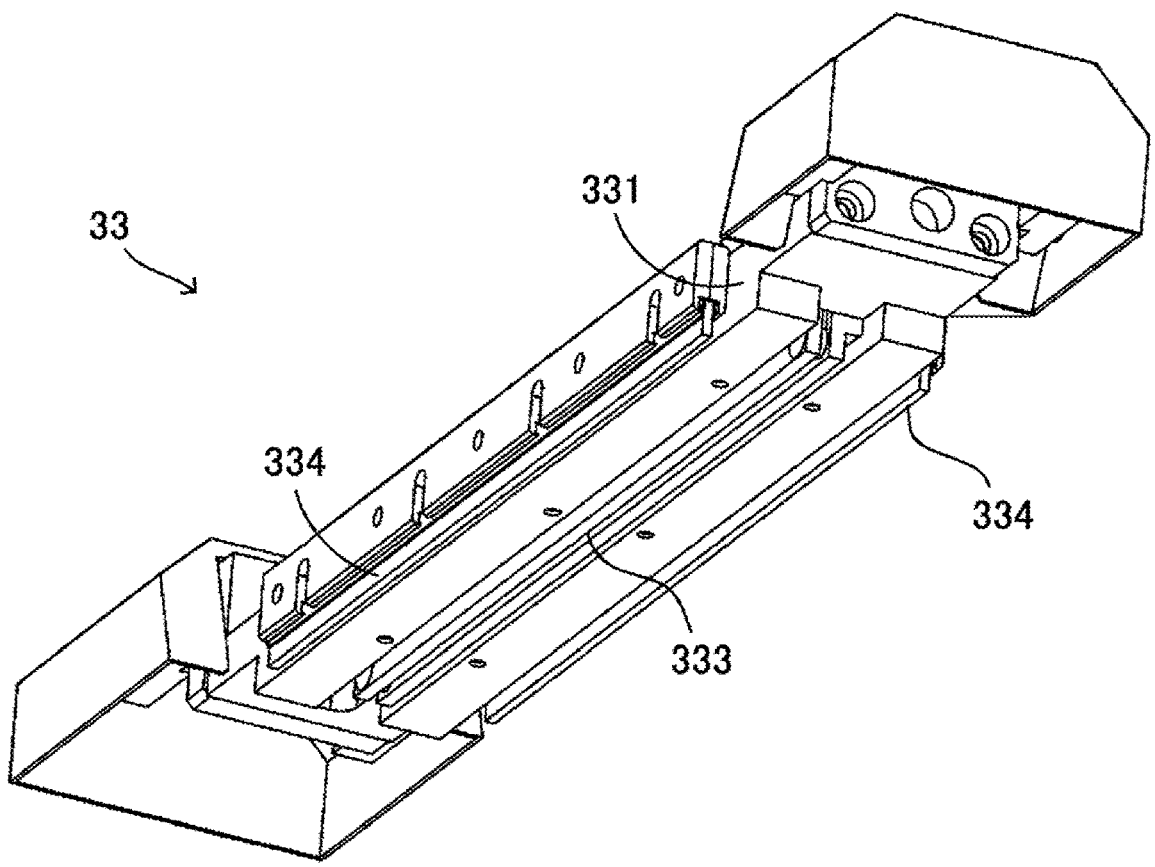
FIG. 6 is a perspective view of the recoater head.

As shown in FIG. 5 and FIG. 6, the recoater head 33 includes a material container 331, a material supply port 332, and a material discharge port 333. The material container 331 stores a material. The material is, for example, metal powder. The material supply port 332 is provided on an upper surface of the material container 331 and serves as a receiving port for the material supplied to the material container 331. When the recoater head 33 is replenished with the material, the material is supplied from a material supply device (not shown) to the material supply port 332 via a guide device 16 provided in the chamber 10. The material discharge port 333 is provided on a bottom surface of the material container 331 and discharges the material in the material container 331. The material discharge port 333 has a slit shape extending in a horizontal direction orthogonal to a movement direction of the recoater head 33. A blade 334 that levels the material and forms the material layer 92 is provided on a side surface of the recoater head 33. The recoater head 33 horizontally reciprocates on the build region R while discharging the material contained in the material container 331 from the material discharge port 333. At this time, the blade 334 flattens the discharged material and forms the material layer 92.

Figure 7:
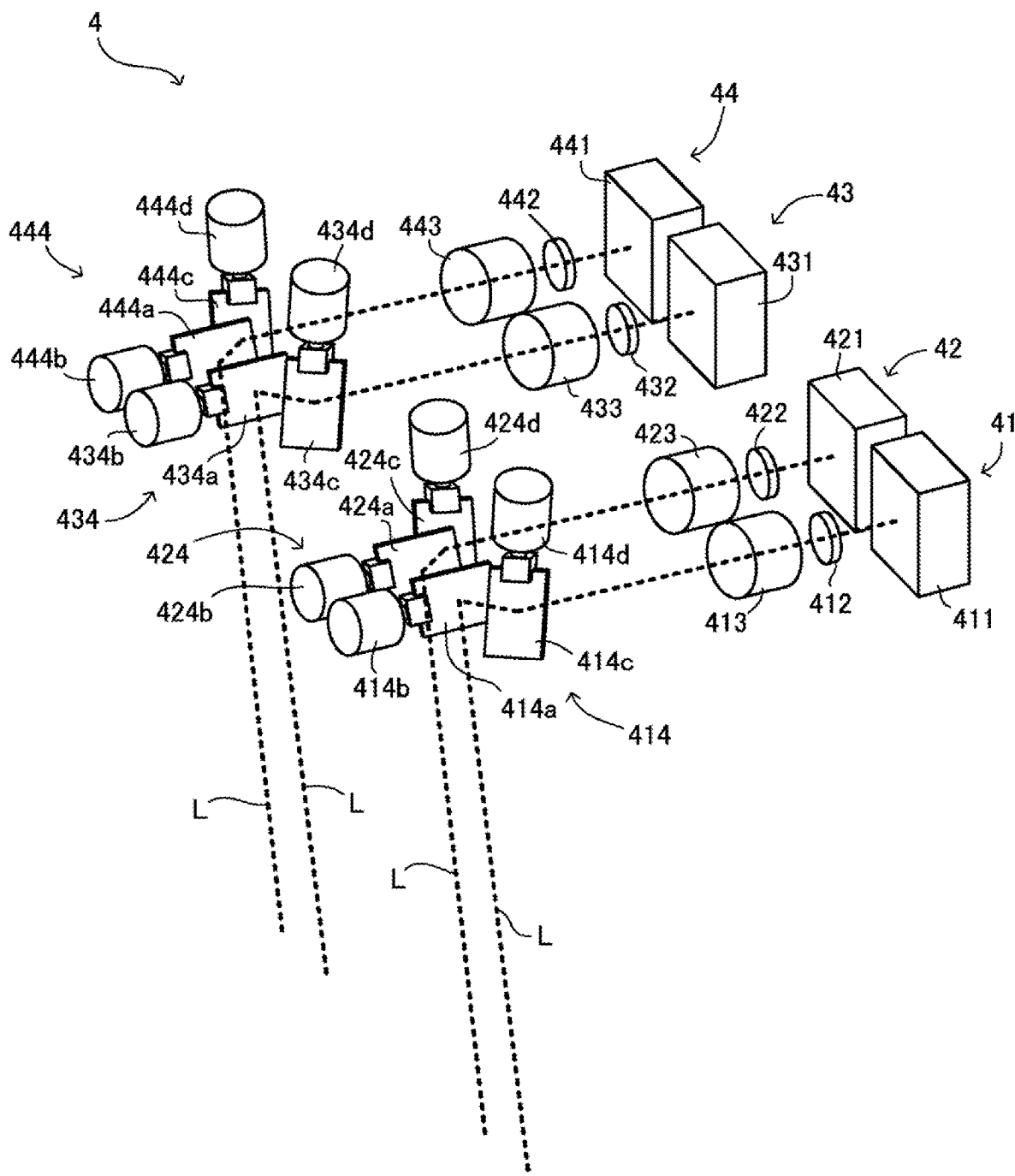
FIG. 7 is a schematic configuration view of the irradiator.

The irradiator 4 is provided above the chamber 10, irradiates the material layer 92 formed in the build region R with the laser beam L and melts or sinters the material at an irradiation position to form the solidified layer 93. In particular, the irradiator 4 of the present embodiment is configured to be able to irradiate a plurality of laser beams L at the same time. As shown in FIG. 7, the irradiator 4 includes a first irradiator 41, a second irradiator 42, a third irradiator 43, and a fourth irradiator 44. In the present embodiment, the first irradiator 41 and the second irradiator 42 are housed in the same housing, so are the third irradiator 43 and the fourth irradiator 44.

The first irradiator 41 includes a beam source 411, a focus control unit 412, an adjustment lens 413, and a scanner 414. The beam source 411 generates the laser beam L. The focus control unit 412 includes a focus control lens, and a motor moving the focus control lens back and forth. A focal position of the laser beam L is adjusted by moving the focus control lens back and forth in an optical axis direction. A position of the adjustment lens 413 is manually adjustable, and an error of an optical system that may occur at the time of assembling the apparatus or the like is finely adjusted. The scanner 414 is specifically a galvanometer scanner, and includes an X-axis galvanometer mirror 414a that scans the laser beam L in an X-axis direction, an X-axis actuator 414b that rotates the X-axis galvanometer mirror 414a, a Y-axis galvanometer mirror 414c that scans the laser beam L in a Y-axis direction, and a Y-axis actuator 414d that rotates the Y-axis galvanometer mirror 414c.

The second irradiator 42 includes a beam source 421, a focus control unit 422, an adjustment lens 423, and a scanner 424. The beam source 421 generates the laser beam L. The focus control unit 422 includes a focus control lens, and a motor moving the focus control lens back and forth. A focal position of the laser beam L is adjusted by moving the focus control lens back and forth in an optical axis direction. A position of the adjustment lens 423 is manually adjustable, and an error of an optical system that may occur at the time of assembling the apparatus or the like is finely adjusted. The scanner 424 is specifically a galvanometer scanner, and includes an X-axis galvanometer mirror 424a that scans the laser beam L in the X-axis direction, an X-axis actuator 424b that rotates the X-axis galvanometer mirror 424a, a Y-axis galvanometer mirror 424c that scans the laser beam L in the Y-axis direction, and a Y-axis actuator 424d that rotates the Y-axis galvanometer mirror 424c.

Preferably, the X-axis galvanometer mirror 414a and the X-axis galvanometer mirror 424a are disposed so as to be plane-symmetrical to each other, and the Y-axis galvanometer mirror 414c and the Y-axis galvanometer mirror 424c are disposed so as to be plane-symmetrical to each other. A distance between the galvanometer mirrors on a downstream side, that is, the X-axis galvanometer mirror 414a and the X-axis galvanometer mirror 424a in the present embodiment, is configured so that the galvanometer mirrors are close to each other. In this way, a difference in shape of an irradiation spot or energy density in the laser beam L scanned by the first irradiator 41 and the laser beam L scanned by the second irradiator 42 can be reduced. The laser beam L respectively scanned by the scanner 414 of the first irradiator 41 and the scanner 424 of the second irradiator 42 passes through a window 14 provided on a top plate of the chamber 10 and is irradiated to the material layer 92. In the present embodiment, the first irradiator 41 and the second irradiator 42 are in charge of irradiation of the left half of the build region R.

The third irradiator 43 includes a beam source 431, a focus control unit 432, an adjustment lens 433, and a scanner 434. The beam source 431 generates the laser beam L. The focus control unit 432 includes a focus control lens, and a motor moving the focus control lens back and forth. A focal position of the laser beam L is adjusted by moving the focus control lens back and forth in an optical axis direction. A position of the adjustment lens 433 is manually adjustable, and an error of an optical system that may occur at the time of assembling the apparatus or the like is finely adjusted. The scanner 434 is specifically a galvanometer scanner, and includes an X-axis galvanometer mirror 434a that scans the laser beam L in the X-axis direction, an X-axis actuator 434b that rotates the X-axis galvanometer mirror 434a, a Y-axis galvanometer mirror 434c that scans the laser beam L in the Y-axis direction, and a Y-axis actuator 434d that rotates the Y-axis galvanometer mirror 434c.

The fourth irradiator 44 includes a beam source 441, a focus control unit 442, an adjustment lens 443, and a scanner 444. The beam source 441 generates the laser beam L. The focus control unit 442 includes a focus control lens, and a motor moving the focus control lens back and forth. A focal position of the laser beam L is adjusted by moving the focus control lens back and forth in an optical axis direction. A position of the adjustment lens 443 is manually adjustable, and an error of an optical system that may occur at the time of assembling the apparatus or the like is finely adjusted. The scanner 444 is specifically a galvanometer scanner, and includes an X-axis galvanometer mirror 444a that scans the laser beam L in the X-axis direction, an X-axis actuator 444b that rotates the X-axis galvanometer mirror 444a, a Y-axis galvanometer mirror 444c that scans the laser beam L in the Y-axis direction, and a Y-axis actuator 444d that rotates the Y-axis galvanometer mirror 444c.

Preferably, the X-axis galvanometer mirror 434a and X-axis galvanometer mirror 444a are disposed so as to be plane-symmetrical to each other, and the Y-axis galvanometer mirror 434c and the Y-axis galvanometer mirror 444c are disposed so as to be plane-symmetrical to each other. The distance between the galvanometer mirrors on the downstream side, that is, the X-axis galvanometer mirror 434a and the X-axis galvanometer mirror 444a in the present embodiment, is configured so that the galvanometer mirrors are close to each other. In this way, a difference in shape of an irradiation spot or energy density in the laser beam L scanned by the third irradiator 43 and the laser beam L scanned by the fourth irradiator 44 can be reduced. The laser beam L respectively scanned by the scanner 434 of the third irradiator 43 and the scanner 444 of the fourth irradiator 44 passes through the window 14 provided on the top plate of the chamber 10 and is irradiated to the material layer 92. In the present embodiment, the third irradiator 43 and the fourth irradiator 44 are in charge of irradiation of the right half of the build region R.

According to the irradiator 4 as described above, it is possible to irradiate up to four laser beams L at the same time. In the additive manufacturing apparatus 1 including the irradiator 4 configured to be able to irradiate a plurality of laser beams L or electron beams at the same time, since the amount of fume generated per hour also increases, it is required to relatively efficiently discharge the fume from the chamber 10.

The irradiator 4 is not limited to the above-described configuration. In the present embodiment, in irradiating a plurality of laser beams L at the same time, the beam sources 411, 421, 431 and 441 are provided one by one for the scanners 414, 424, 434 and 444. However, the laser beam L generated by one beam source may be split by a beam splitter or the like and sent to each of the scanners 414, 424, 434 and 444. The irradiator 4 may be a device that irradiates an electron beam. For example, the irradiator 4 has a cathode electrode emitting electrons, an anode electrode converging and accelerating electrons, a solenoid forming a magnetic field and converging directions of an electron beam into one direction, and a collector electrode electrically connected to the material layer 92 as an irradiated body and applying a voltage between itself and the cathode electrode. At this time, the cathode electrode and the anode electrode serve as a beam source that outputs an electron beam, and the solenoid serves as a scanner that scans an electron beam. That is, the irradiator 4 is configured to include at least one beam source that generates the laser beam L or an electron beam and at least one scanner that scans the laser beam L or an electron beam. Preferably, the irradiator 4 is configured to include at least one beam source that generates the laser beam L or an electron beam, and a plurality of scanners that scan the laser beam L or an electron beam, and be able to irradiate a plurality of laser beams L or electron beams at the same time.

Figure 8:
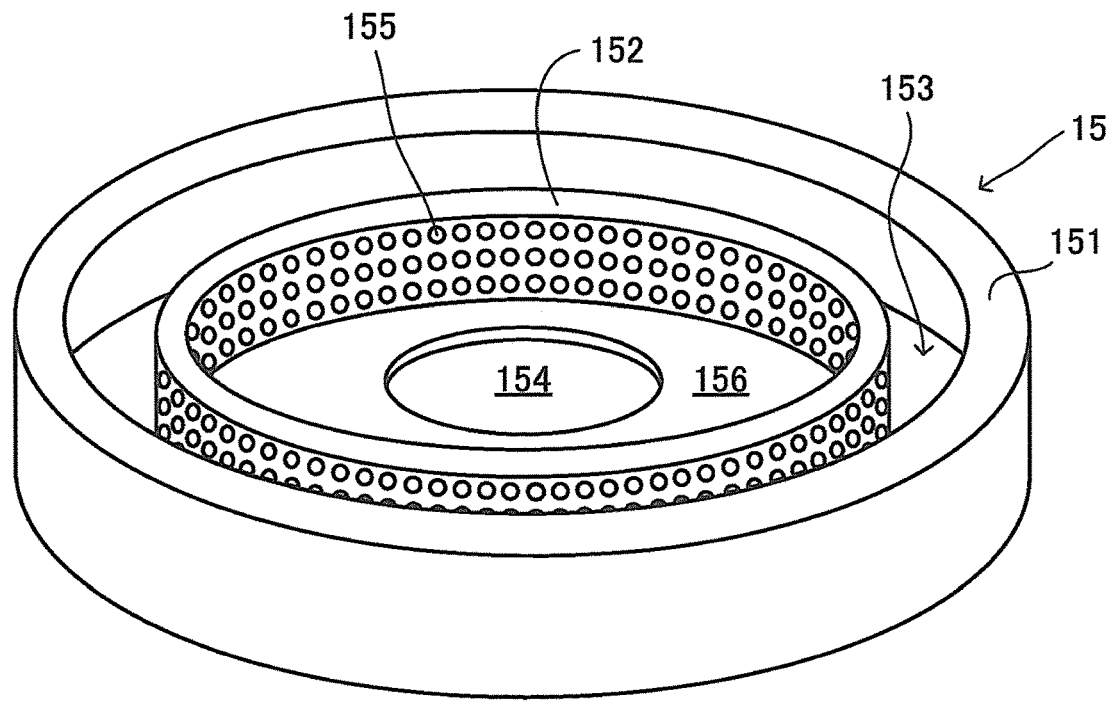
FIG. 8 is a schematic configuration view of a contamination prevention device.

A contamination prevention device 15 is provided on the top plate of the chamber 10 so as to cover the window 14. As shown in FIG. 8, the contamination prevention device 15 includes a housing 151 having a cylindrical shape and a diffusing member 152 having a cylindrical shape and disposed inside the housing 151. An inert gas supplying space 153 is provided between the housing 151 and the diffusing member 152. An opening part 154 is provided on a bottom surface of the housing 151 inside the diffusing member 152. A large number of pores 155 are provided in the diffusing member 152, and a clean inert gas supplied to the inert gas supplying space 153 fills a clean room 156 through the pores 155. Then, the clean inert gas that fills the clean room 156 is ejected toward below the contamination prevention device 15 through the opening part 154. In this way, since a region below the window 14 is filled with the clean inert gas and a stream of the inert gas is generated downward from the window 14, adhesion of fumes to the window 14 is prevented. The inert gas supplying space 153 is supplied with the inert gas via a contamination prevention device supply port 21 provided on the top plate of the chamber 10. Since there is a possibility that a small amount of fume may remain in the gas returned from the fume collector 23, the contamination prevention device supply port 21 is preferably connected only to the inert gas supply device 22.

Figure 9:
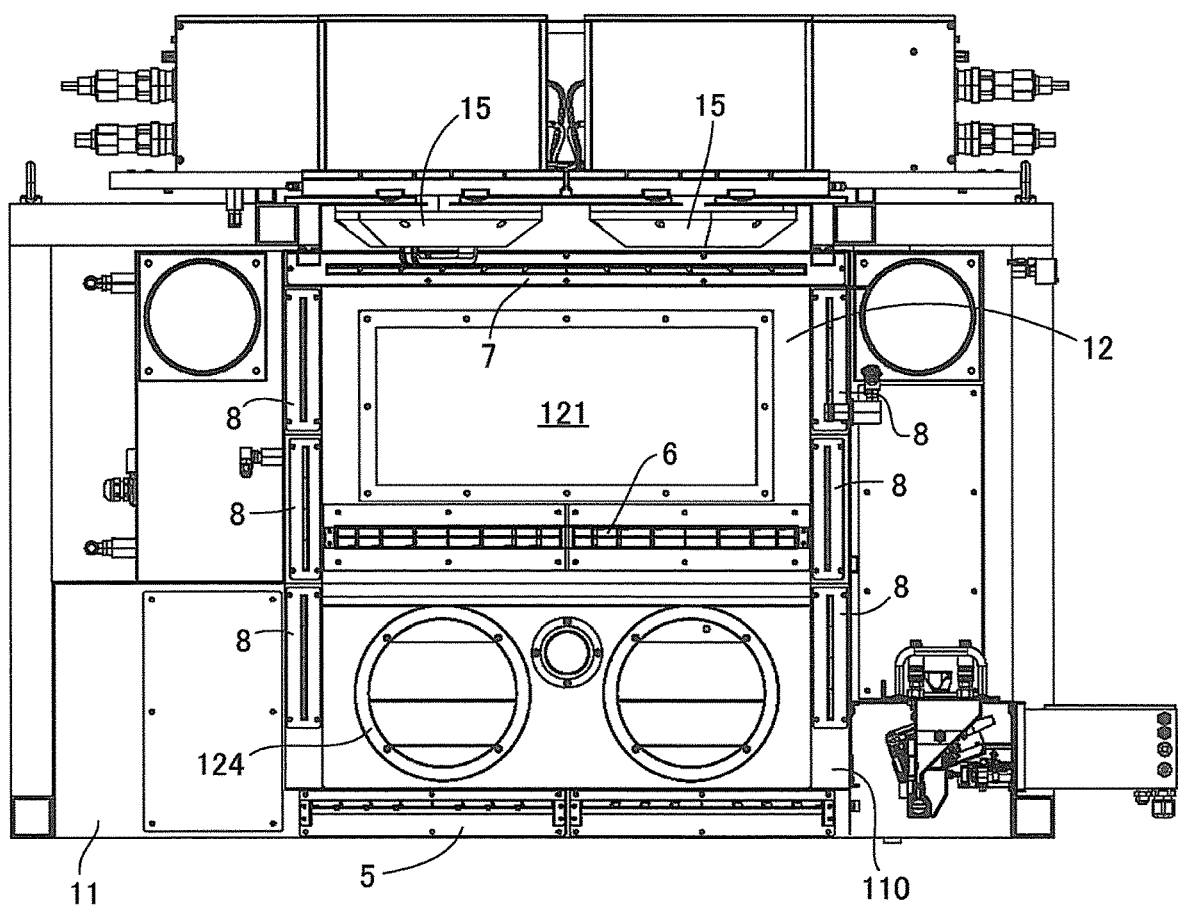
FIG. 9 is a sectional view as viewed from the inside of the chamber to a front side.

Here, an embodiment of the gas supplier 2 is described in detail. The gas supplier 2 supplies the inert gas to the chamber 10. More specifically, the gas supplier 2 supplies the inert gas sent from the inert gas supply device 22 and the fume collector 23 to the chamber 10, and generates a stream of the inert gas flowing from the front to the back. FIG. 9 schematically shows a positional relationship between each part of the gas supplier 2. The gas supplier 2 of the present embodiment includes a lower nozzle 5, a middle nozzle 6, an upper nozzle 7, and a plurality of side nozzles 8.

Figure 10:
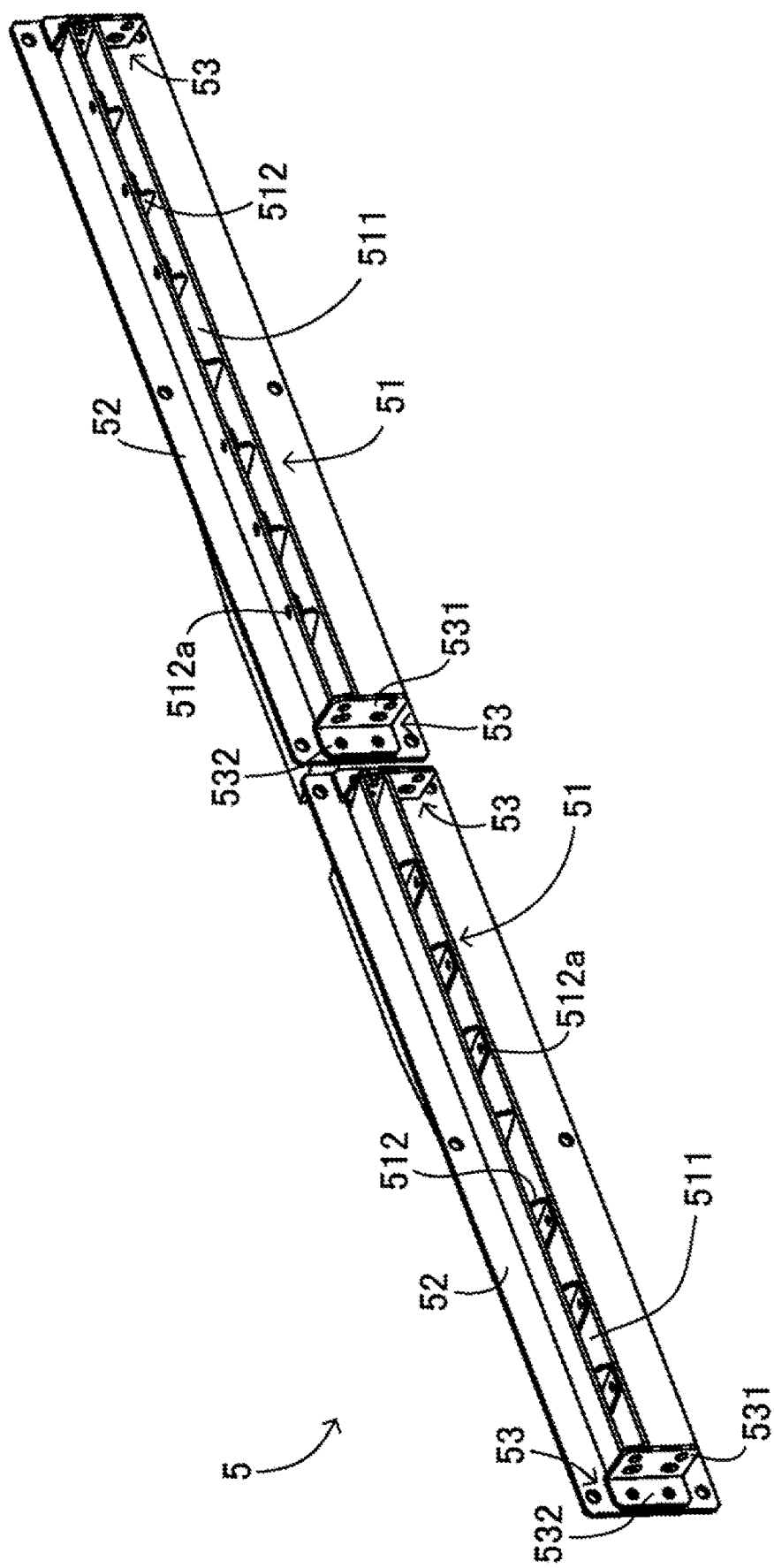
FIG. 10 is a perspective view of a lower nozzle.
Figure 11:
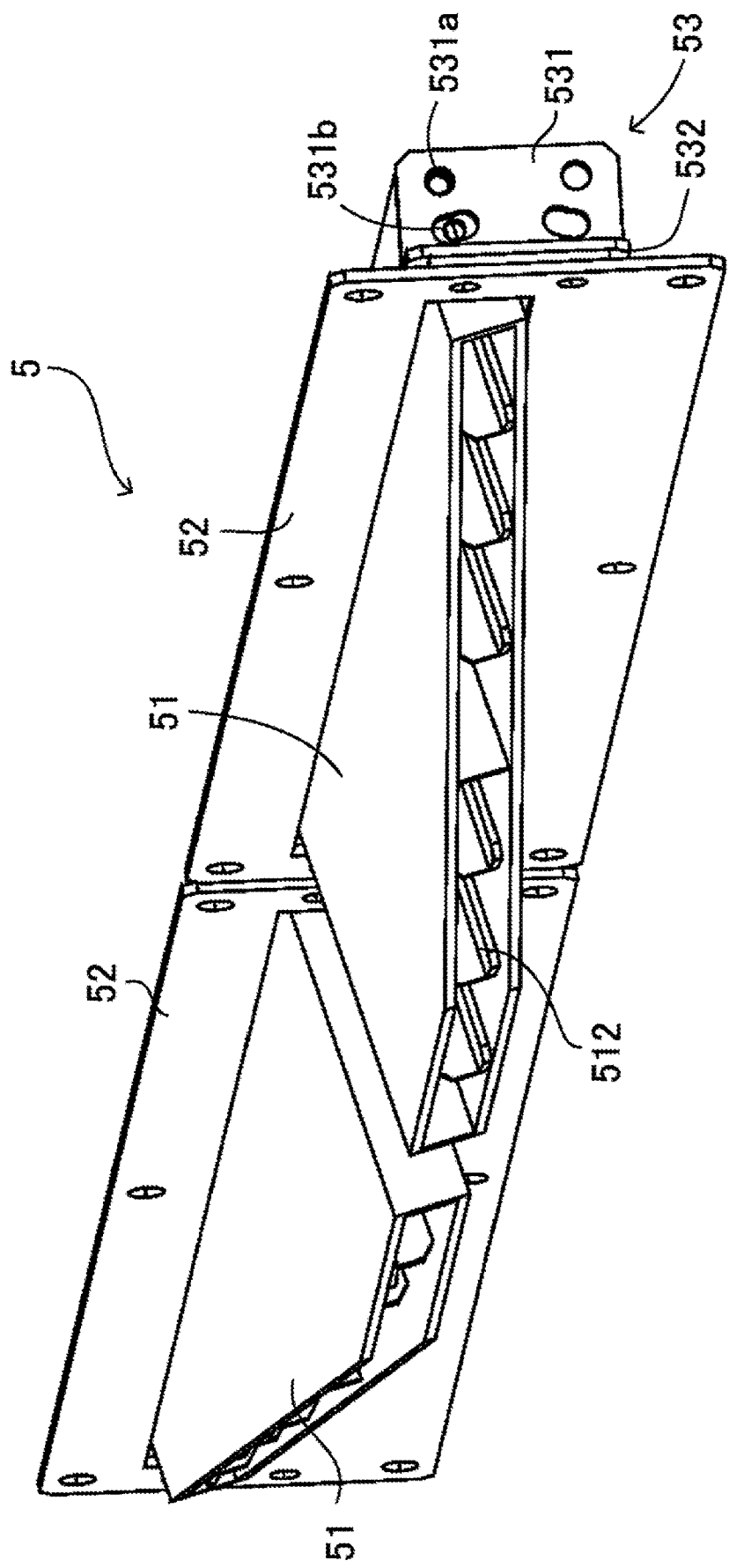
FIG. 11 is a perspective view of the lower nozzle.

The lower nozzle 5 generates a stream of the inert gas in a direction from the front to the back in the lower space inside the chamber 10. The stream of the inert gas generated in the lower space transfers the fume occurring in the build region R toward the back. The lower nozzle 5 is provided below the middle nozzle 6 in a position on the front plate 11 side inside the chamber 10, that is, arranged in front of the build region R inside the chamber 10. More specifically, in the present embodiment, the lower nozzle 5 is attached to the frame 110 of the front plate 11 below the opening 111. As shown in FIG. 10 and FIG. 11, the lower nozzle 5 includes a pair of lower ducts 51, a lower support member 52 holding each lower duct 51, and a lower bracket 53 provided at an end of each lower duct 51.

The lower duct 51 is a tubular member allowing the inert gas to circulate therethrough. A lower blowout port 511 that blows out the inert gas is formed on a back side, that is, the build region R side, of the lower duct 51. The inert gas sent from the inert gas supply device 22 and the fume collector 23 is sent to the lower duct 51 via the introduction port of the frame 110 and ejected from the lower blowout port 511.

The lower support member 52 is, for example, a plate-shaped member, holds the lower duct 51 and fixes the lower duct 51 to the frame 110.

The lower bracket 53 is, for example, an L-shaped metal plate, and connects the lower duct 51 with the lower support member 52. That is, the lower bracket 53 has a first surface 531 that fixes the lower duct 51 and a second surface 532 that fixes the lower support member 52.

Preferably, a blowout direction of the inert gas from the lower blowout port 511 is configured to be adjustable. The lower nozzle 5 includes a plurality of lower louvers 512 pivotally supported on the lower duct 51 so as to be swingable from side to side. A plurality of journal holes 512a being through holes are formed in the lower duct 51, and the lower louver 512 is fixed by a bolt inserted through the journal hole 512a. By adjusting the lower louver 512 to a desired angle and then fixing it, the blowout direction in the left-right direction is adjusted. On the first surface 531 of the lower bracket 53, a journal hole 531a being a through hole and an elongated hole 531b being an arc-shaped elongated hole are formed. By bolts respectively inserted through the journal hole 531a and the elongated hole 531b, the lower duct 51 is fixed to the lower bracket 53. That is, the lower duct 51 is supported so as to be swingable up and down about the journal hole 531a. By adjusting the lower duct 51 to a desired inclination and then fixing it, the blowout direction in the up-down direction is adjusted. It is desired that the blowout direction of the inert gas from the lower blowout port 511 be slightly upward rather than horizontal so as not to soar up the material in the build region R. For example, the blowout direction of the inert gas from the lower blowout port 511 may be configured to be adjustable in a range of about 5° to about 25° where the horizontal direction is set as 0°.

In the present embodiment, a pair of lower ducts 51 are provided, the inclination of each of which is independently adjustable. However, the lower duct 51 may be integrally formed across the left and right sides, or a plurality of lower ducts 51 may be connected by a connection member. In the present embodiment, the lower nozzle 5 is attached to the frame 110. However, the lower nozzle 5 may be provided in any position below the middle nozzle 6 on the front plate 11 side inside the chamber 10. A means of adjusting the blowout direction of the lower blowout port 511 is not limited to the above-described configuration. For example, the blowout direction in the up-down direction may be adjusted by a louver pivotally supported on the lower duct 51 so as to be swingable up and down. A fan may be provided at the lower nozzle 5 to improve the straightness of the inert gas ejected from the lower blowout port 511.

Figure 12:
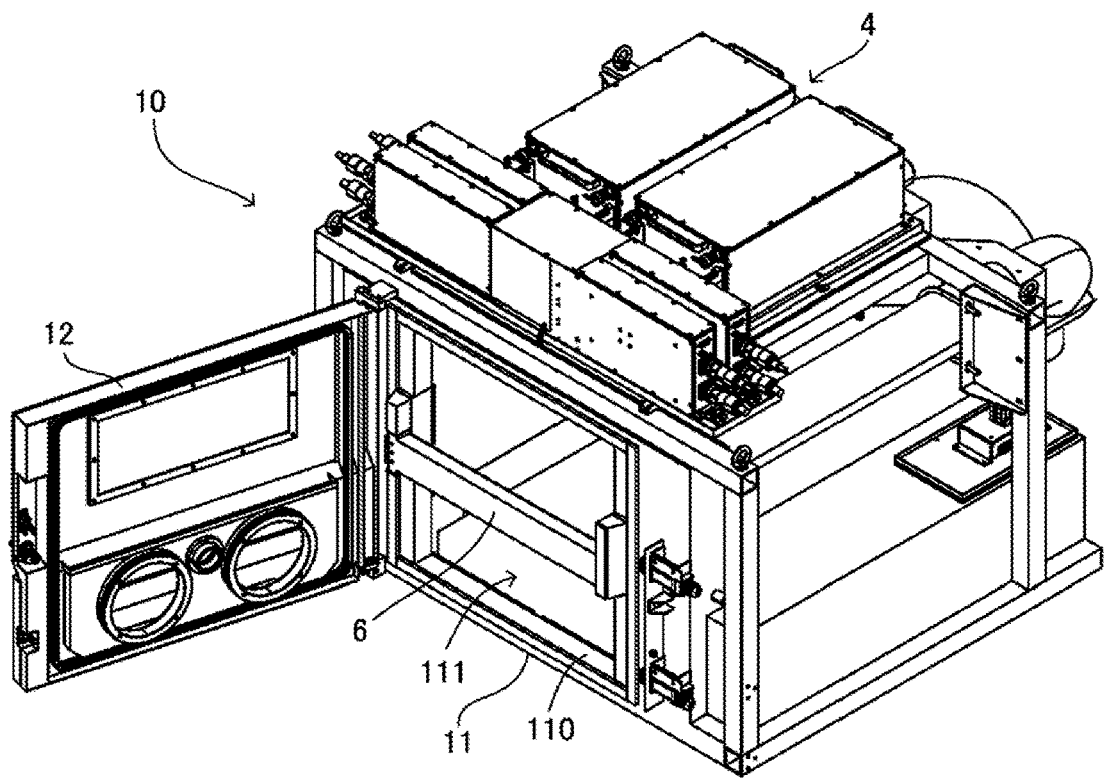
FIG. 12 shows the chamber with a door opened and a middle nozzle closed.
Figure 13:
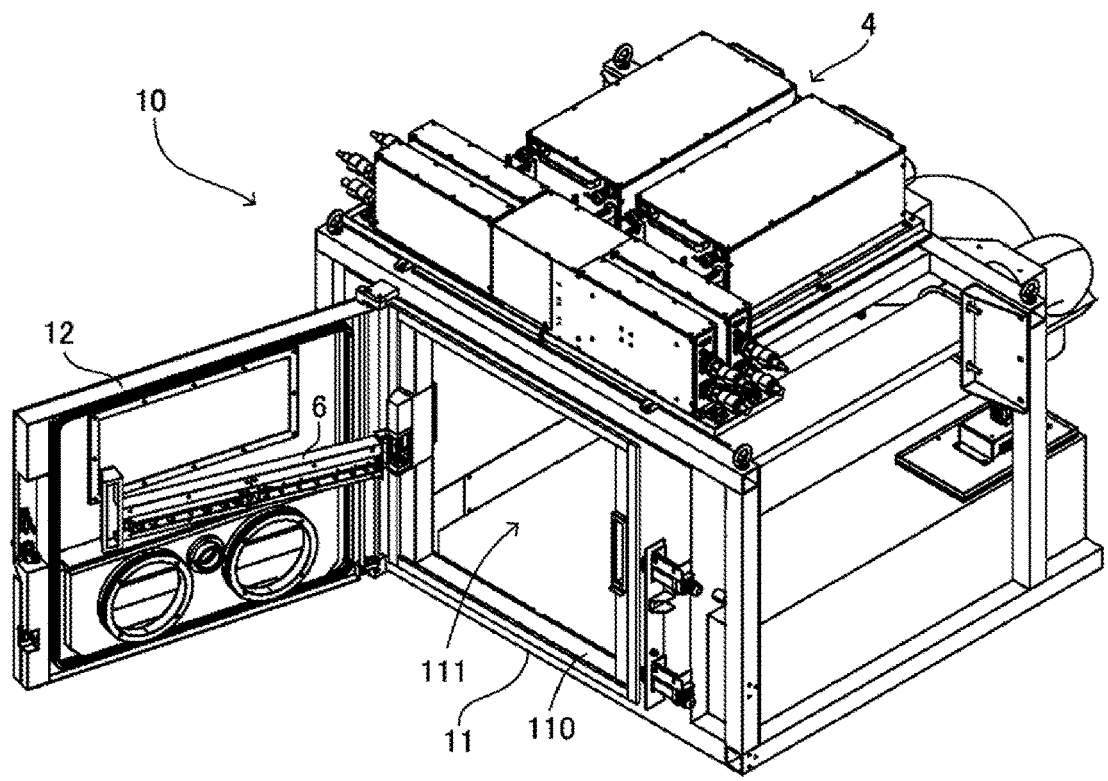
FIG. 13 shows the chamber with the door and the middle nozzle opened.
Figure 14:
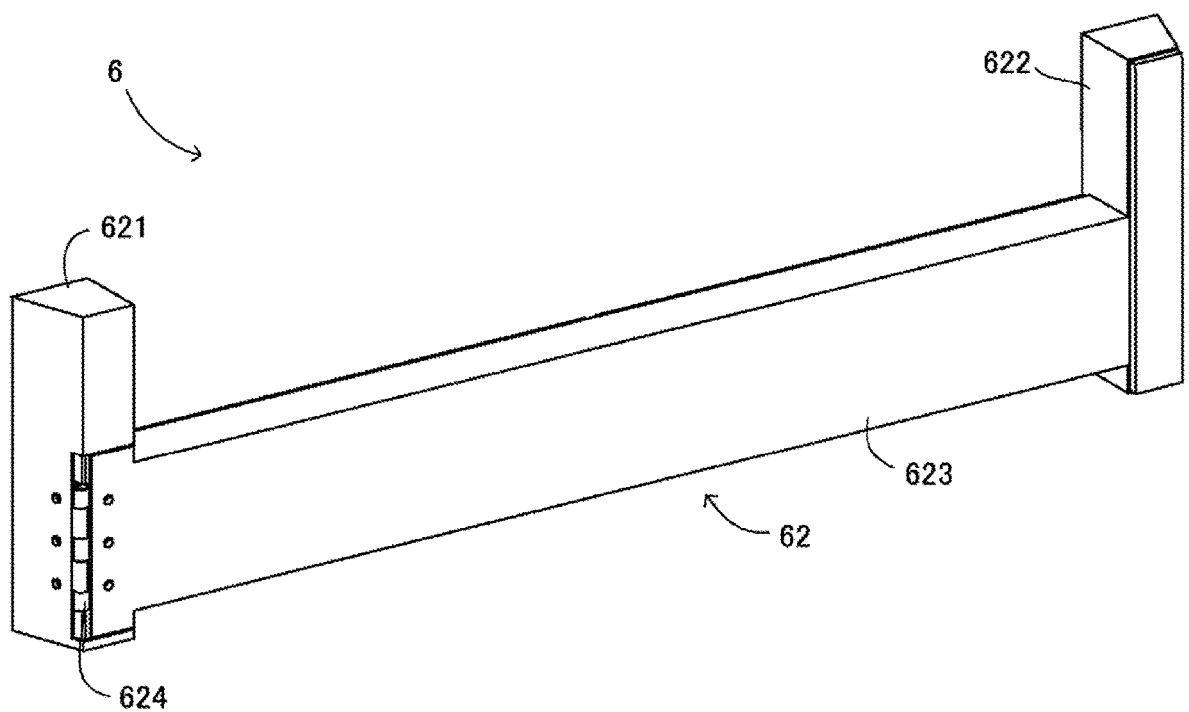
FIG. 14 is a perspective view of the middle nozzle.
Figure 15:
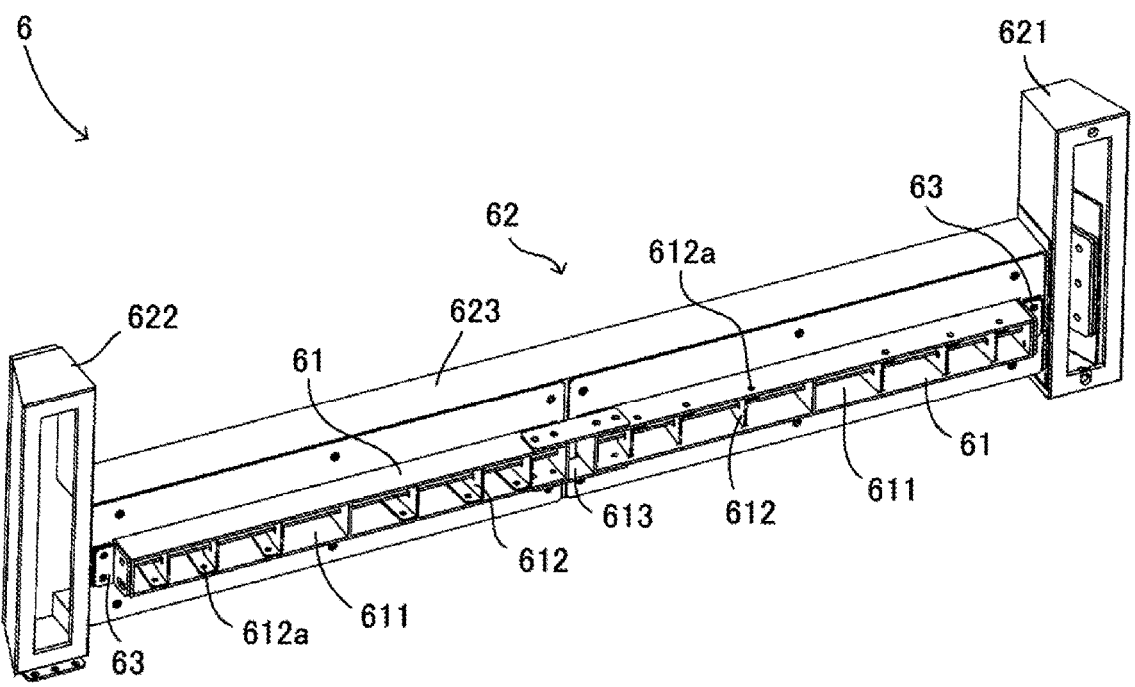
FIG. 15 is a perspective view of the middle nozzle.
Figure 16:
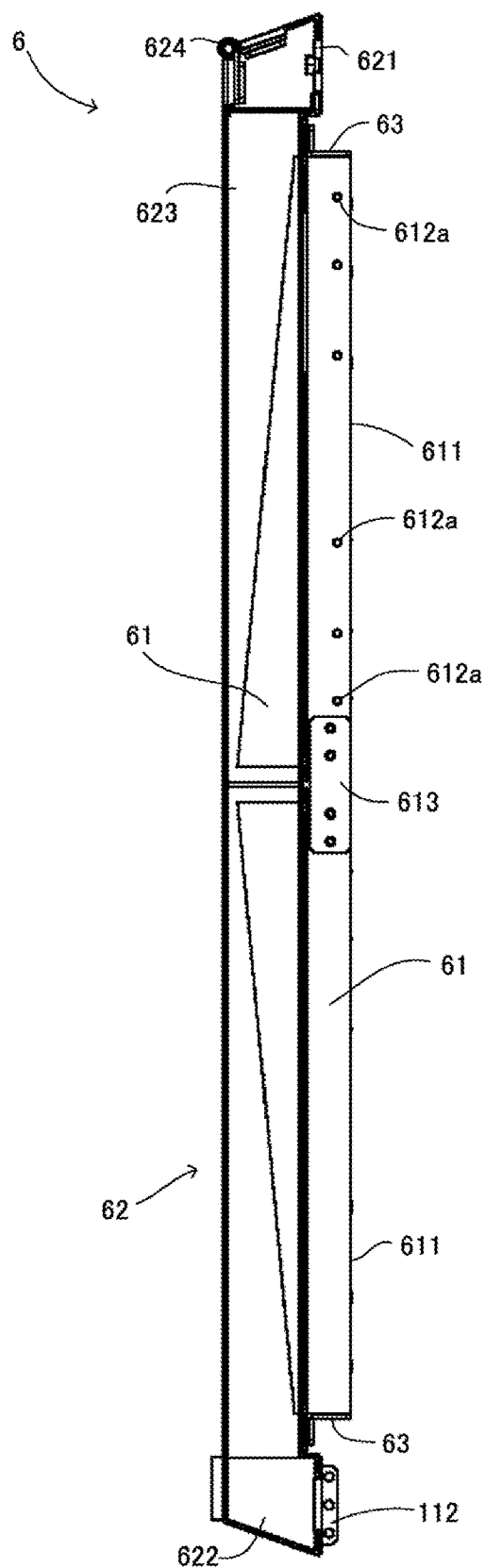
FIG. 16 is a top sectional view of the middle nozzle.
Figure 17:
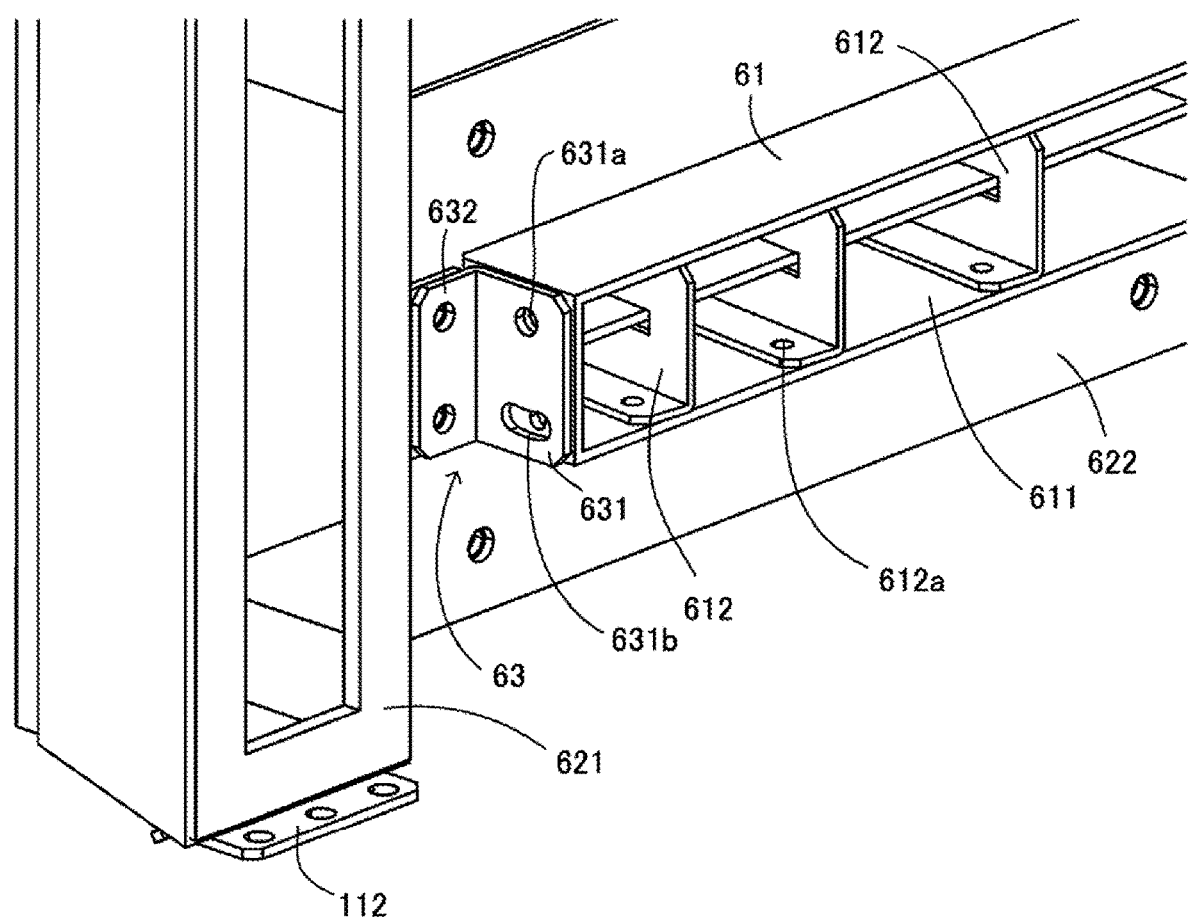
FIG. 17 is an enlarged view of a middle bracket.

The middle nozzle 6 generates a stream of an inert gas in the direction from the front to the back in the middle space inside the chamber 10. The stream of the inert gas generated in the middle space transfers the fume that has risen without being removed by the stream in the lower space toward the back. As shown in FIG. 12 and FIG. 13, the middle nozzle 6 is provided at the opening 111 of the front plate 11, has one end swingably supported on the front plate 11, and is configured to swing independently of opening and closing of the door 12. When the door 12 is closed, the middle nozzle 6 is pressed by the front plate 11 and fixed in a predetermined position, and crosses the opening 111 of the front plate 11. In the following, a state in which the other end of the middle nozzle 6 is in contact with the front plate 11 is referred to as a state in which the middle nozzle 6 is closed, and a state in which the other end of the middle nozzle 6 is separated from the front plate 11 is referred to as a state in which the middle nozzle 6 is open. As shown in FIG. 14 to FIG. 17, the middle nozzle 6 includes a pair of middle ducts 61, a middle support member 62 holding each middle duct 61, and a middle bracket 63 provided at an end of each middle duct 61.

The middle duct 61 is a tubular member allowing the inert gas to circulate therethrough. A middle blowout port 611 that blows out the inert gas is formed on the back side, that is, the build region R side, of the middle duct 61. The pair of middle ducts 61 are connected to each other by a connection member 613.

The middle support member 62 is, for example, a tubular member allowing the inert gas to circulate therethrough, and holds the middle duct 61 in a swingable manner. Specifically, the middle support member 62 includes a passage part 623, as well as a fixed part 621 and a contact/separate part 622 respectively provided at both ends of the passage part 623. The fixed part 621 is fixed to the frame 110 of the front plate 11. The fixed part 621 and the passage part 623 are connected via a hinge 624, and the passage part 623 and the contact/separate part 622 swing about the hinge 624. As it swings, the contact/separate part 622 contacts or is separated from the frame 110 of the front plate 11. When the contact/separate part 622 is in contact with the frame 110, the contact/separate part 622 is supported by a holding plate 112 attached to the frame 110. The inert gas is supplied to the passage part 623 via at least one of the fixed part 621 and the contact/separate part 622. In the present embodiment, the inert gas is supplied to the passage part 623 from both the fixed part 621 and the contact/separate part 622. Specifically, the fixed part 621 and the contact/separate part 622 have an inert gas inlet formed on a contact surface with the frame 110, and the inert gas inlet engages with the introduction port for the inert gas formed in the frame 110. The inert gas supplied from the frame 110 via the fixed part 621 and the contact/separate part 622 circulates through the passage part 623, and the passage part 623 supplies the inert gas to the middle duct 61. That is, the inert gas sent from the inert gas supply device 22 and the fume collector 23 is sent to the middle duct 61 via the introduction port of the frame 110 and the middle support member 62 and ejected from the middle blowout port 611.

The middle bracket 63 is, for example, an L-shaped metal plate, and connects the middle duct 61 with the middle support member 62. That is, the middle bracket 63 has a first surface 631 that fixes the middle duct 61 and a second surface 632 that fixes the middle support member 62.

Preferably, the blowout direction of the inert gas from the middle blowout port 611 is configured to be adjustable. The middle nozzle 6 includes a plurality of middle louvers 612 pivotally supported on the middle duct 61 so as to be swingable from side to side. A plurality of journal holes 612a being through holes are formed in the middle duct 61, and the middle louver 612 is fixed by a bolt inserted through the journal hole 612a. By adjusting the middle louver 612 to a desired angle and then fixing it, the blowout direction in the left-right direction is adjusted. On the first surface 631 of the middle bracket 63, a journal hole 631a being a through hole and an elongated hole 631b being an arc-shaped elongated hole are formed. By bolts respectively inserted through the journal hole 631a and the elongated hole 631b, the middle duct 61 is fixed to the middle bracket 63. That is, the middle duct 61 is supported so as to be swingable up and down about the journal hole 631a. By adjusting the middle duct 61 to a desired inclination and then fixing it, the blowout direction in the up-down direction is adjusted. For example, the blowout direction of the inert gas from the middle blowout port 611 may be configured to be adjustable in a range of about −10° to about 10°, where the horizontal direction is set as 0°.

In the present embodiment, a pair of middle ducts 61 are provided and are connected to each other by the connection member 613. However, the middle duct 61 may be integrally formed across the left and right sides, or a plurality of middle ducts 61 may be configured so that their inclination is independently adjustable. In the present embodiment, the middle nozzle 6 is supported by the holding plate 112 when the middle nozzle 6 is closed. However, another means of directly or indirectly fixing the middle nozzle 6 to the front plate 11 may be provided. A means of adjusting the blowout direction of the middle blowout port 611 is not limited to the above-described configuration. For example, the blowout direction in the up-down direction may be adjusted by a louver pivotally supported on the middle duct 61 so as to be swingable up and down. A fan may be provided at the middle nozzle 6 to improve the straightness of the inert gas ejected from the middle blowout port 611.

As described above, the middle nozzle 6 is able to swing independently of opening and closing of the door 12. Since the middle nozzle 6 remains substantially closed when the door 12 is opened, the material accumulating on the middle nozzle 6 can be prevented from falling out of the apparatus. By configuring the middle nozzle 6 to be openable and closable, during work including setup work such as mounting of the base plate 91, maintenance such as cleaning or part replacement inside the chamber 10, and takeout of the manufactured three-dimensional object, the middle nozzle 6 can be moved to a position where it does not hinder the work. In adjusting the blowout direction of the inert gas, since the adjustment can be performed with the door 12 opened and the middle nozzle 6 closed, burden on the operator during the adjustment work is reduced.

Here, an adjustment method of the blowout direction is specifically described. First, the door 12 and the middle nozzle 6 are opened, and an anemometer is installed on the build region R, that is, on the build table 35. The anemometer is installed so as to be able to detect a gas velocity in the lower space of the chamber 10, for example, at a measurement position located about 50 mm from a build surface being an upper surface position of the material layer 92 at the time of manufacturing. Preferably, a plurality of measurement positions are provided in a grid pattern in a plan view of the build region R. For example, the anemometer detects the gas velocity at nine measurement positions. Then, the inert gas is ejected from the lower nozzle 5. While the gas velocity is being checked, an attachment angle of the lower louver 512 and the lower duct 51 is adjusted so that a desired stream is obtained, and the lower louver 512 and the lower duct 51 are fixed with bolts and nuts. Next, a detection height of the anemometer is changed. The anemometer is installed so as to be able to detect the gas velocity in the middle space of the chamber 10, for example, at a measurement position located about 350 mm from the build surface. Similarly, it is preferred that a plurality of measurement positions be provided in a grid pattern in a plan view of the build region R. Then, the middle nozzle 6 is closed, and the inert gas is ejected from the middle nozzle 6. While the gas velocity is being checked, an attachment angle of the middle louver 612 and the middle duct 61 is adjusted so that a desired stream is obtained, and the middle louver 612 and the middle duct 61 are fixed with bolts and nuts.

In this way, the blowout direction of the inert gas from the lower blowout port 511 and the middle blowout port 611 is adjusted. In the additive manufacturing apparatus 1 of the present embodiment, the middle nozzle 6 is not provided on the door 12 and is able to swing independently of opening and closing of the door 12. Hence, the gas velocity in the middle space can be measured and the blowout direction of the middle blowout port 611 can be adjusted with the door 12 opened, and workability is good. The adjustment method described above is just an example, and the specific procedure may be different. The adjustment of the blowout direction may be performed, for example, after assembly of the apparatus, or after maintenance or modification in which a stream inside the chamber 10 may change. Since the blowout direction of the inert gas is affected by an error in manufacture or assembly of devices related to stream generation or by a difference in specifications between each apparatus, even if each device is designed in advance so as to obtain a desired stream, it is difficult to obtain a stream as designed. By providing the lower nozzle 5 and the middle nozzle 6 with a blowout direction adjustment mechanism, it becomes easy to obtain a desired stream.

Figure 18:
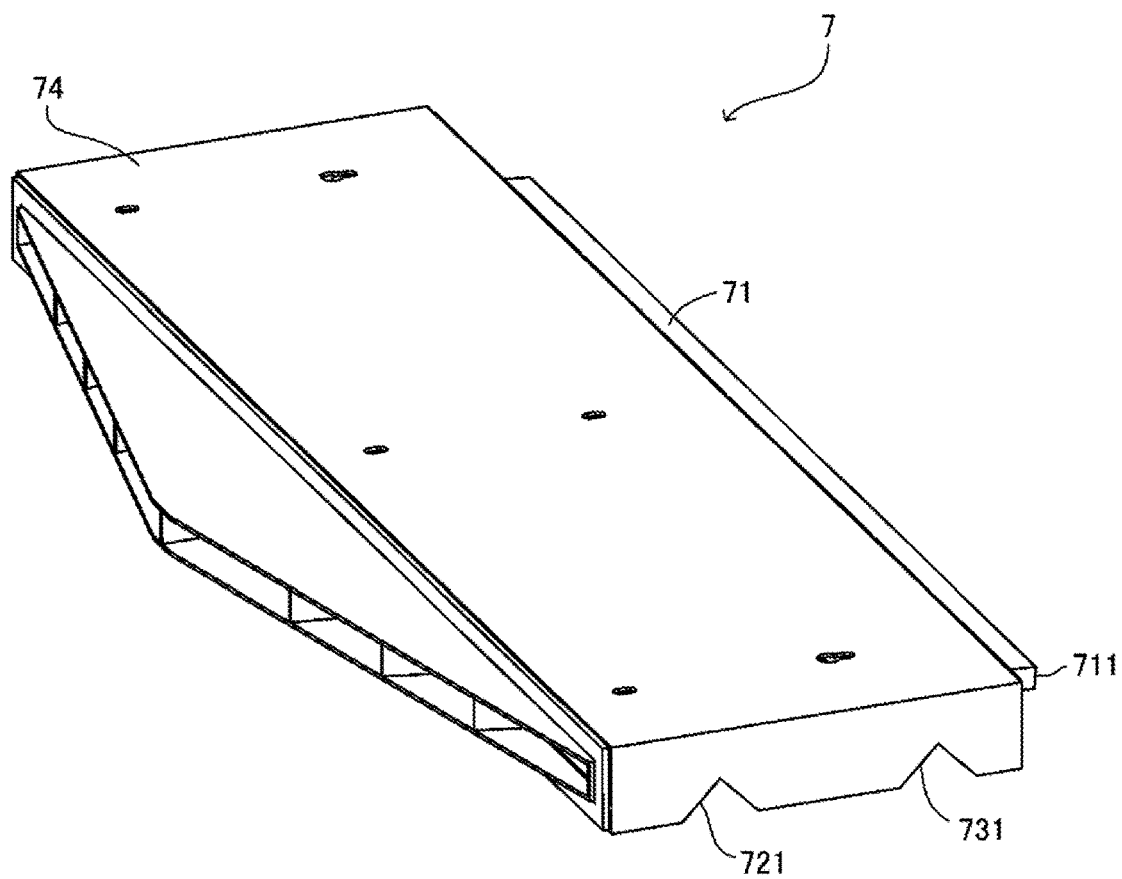
FIG. 18 is a perspective view of an upper nozzle.
Figure 19:
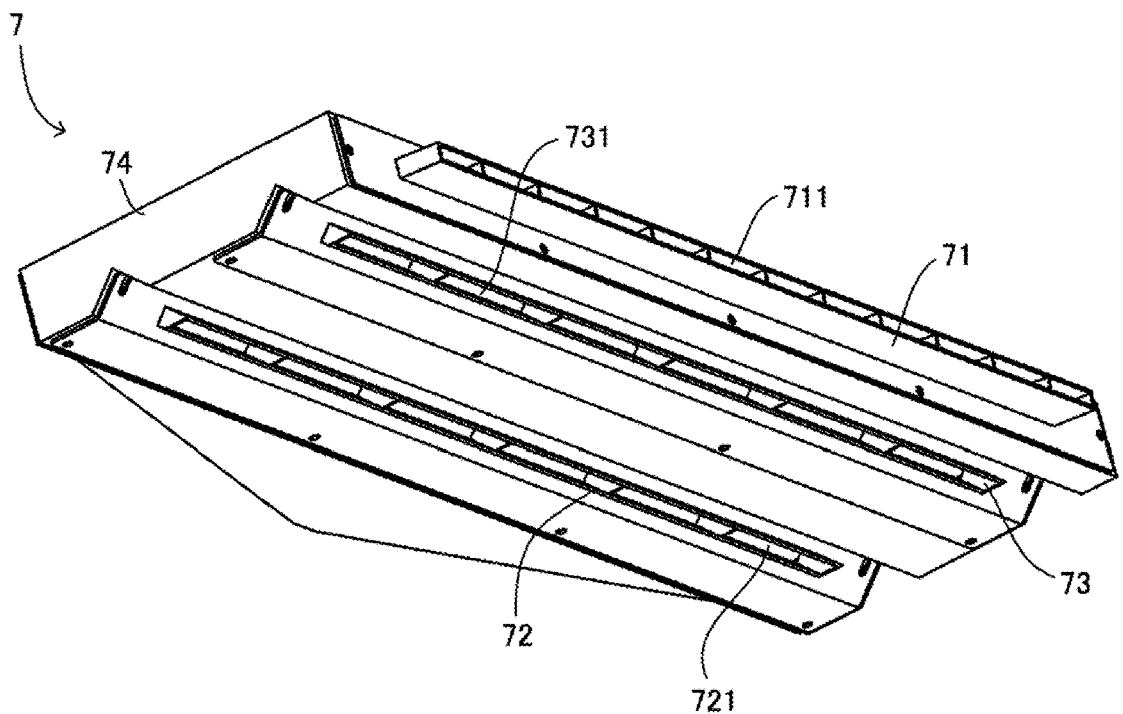
FIG. 19 is a perspective view of the upper nozzle.
Figure 20:
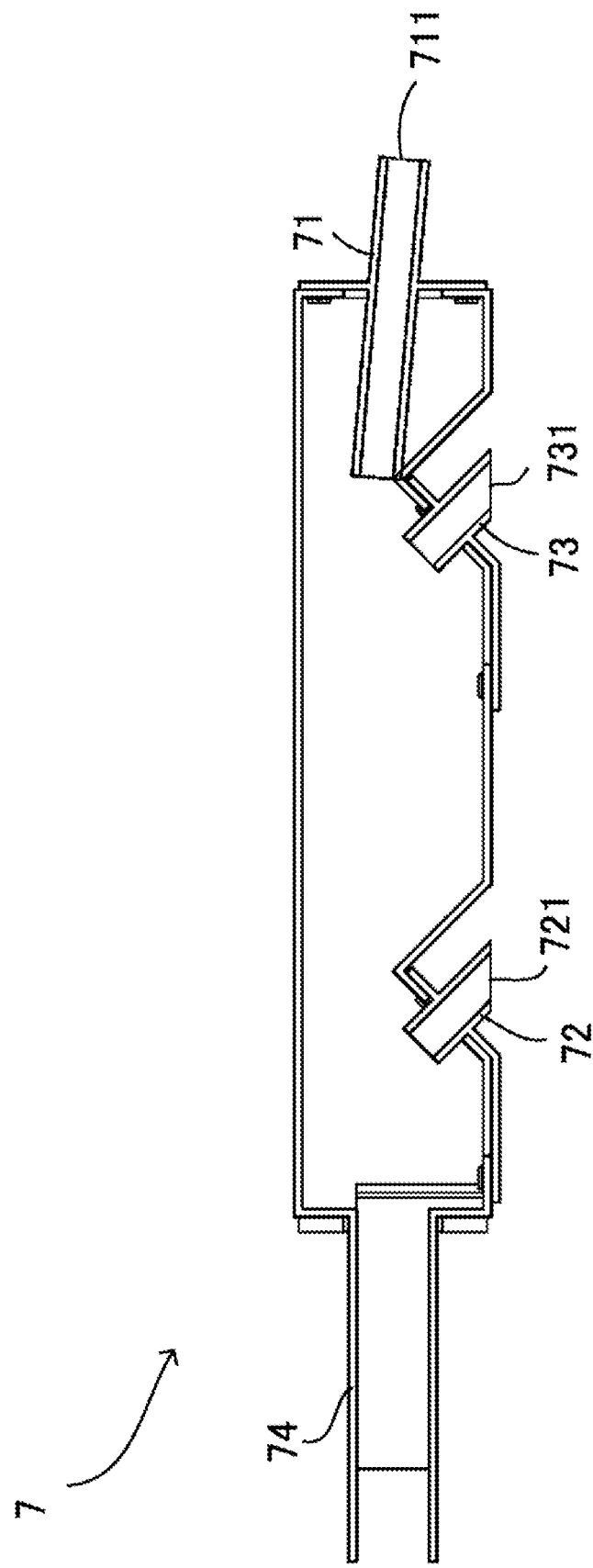
FIG. 20 is a side sectional view of the upper nozzle.

The upper nozzle 7 generates a stream of an inert gas in the direction from the front to the back in the upper space inside the chamber 10. The stream of the inert gas generated in the upper space pushes the fume that has risen back downward, and transfers the fume that has still risen to the vicinity of the window 14 toward the back. The upper nozzle 7 is provided above the middle nozzle 6 in a position on the front plate 11 side inside the chamber 10, that is, arranged in front of the build region R inside the chamber 10. More specifically, in the present embodiment, the upper nozzle 7 is attached to the frame 110 of the front plate 11 above the opening 111. As shown in FIG. 18 to FIG. 20, the upper nozzle 7 includes a first upper duct 71, a second upper duct 72, a third upper duct 73, and an upper support member 74 holding the first upper duct 71, the second upper duct 72 and the third upper duct 73.

The first upper duct 71, the second upper duct 72 and the third upper duct 73 are each a tubular member allowing the inert gas to circulate therethrough. Upper blowout ports 711, 721 and 731 that blow out the inert gas are respectively formed on a back side, that is, the build region R side, of the first upper duct 71, the second upper duct 72 and the third upper duct 73.

The first upper duct 71 in which the upper blowout port 711 is formed is provided on a position closer to the window 14 than the second upper duct 72 and the third upper duct 73. The blowout direction of the inert gas from the upper blowout port 711 is set to be substantially horizontal toward directly below the window 14. However, since there is a possibility that a fume floating in the vicinity may be caught in the stream of the inert gas blown out from the upper blowout port 711, it is desired that the blowout direction of the inert gas from the upper blowout port 711 be slightly inclined downward so that the inert gas does not directly touch the window 14. For example, the blowout direction of the inert gas from the upper blowout port 711 is about −5° when the horizontal direction is set as 0°.

The second upper duct 72 in which the upper blowout port 721 is formed and the third upper duct 73 in which the upper blowout port 731 is formed are provided on the front side of the first upper duct 71. The blowout direction of the inert gas from the upper blowout port 721 and the upper blowout port 731 is set to be directly downward or obliquely downward. For example, the blowout direction of the inert gas from the upper blowout ports 721 and 731 is about −45° when the horizontal direction is set as 0°. That is, the upper blowout port 721 of the second upper duct 72 and the upper blowout port 731 of the third upper duct 73 are directed further downward than the upper blowout port 711 of the first upper duct 71. The stream of the inert gas from the upper blowout ports 721 and 731 prevent a fume from staying in a space above the middle nozzle 6.

The upper support member 74 is, for example, a tubular member allowing the inert gas to circulate therethrough, and holds the first upper duct 71, the second upper duct 72 and the third upper duct 73. The inert gas sent from the inert gas supply device 22 and the fume collector 23 is sent to the first upper duct 71, the second upper duct 72 and the third upper duct 73 via the introduction port of the frame 110 and the upper support member 74 and ejected from the upper blowout ports 711, 721 and 731. It is desired that a flow velocity at the upper blowout port 711 be greater than a flow velocity at the upper blowout ports 721 and 731.

In the present embodiment, the upper nozzle 7 includes the first upper duct 71, the second upper duct 72 and the third upper duct 73. However, the number of upper ducts is not limited as long as the stream in the upper space can be generated. The blowout direction of the inert gas from the upper blowout port 721 may be different from that from the upper blowout port 731, and the blowout direction may be directly downward, that is, at any angle including about −90°. In the present embodiment, the upper nozzle 7 is attached to the frame 110. However, the upper nozzle 7 may be provided in any position above the middle nozzle 6 on the front plate 11 side inside the chamber 10. In the present embodiment, the blowout direction of the inert gas from the upper blowout ports 711, 721 and 731 is fixed. However, the blowout direction may be configured to be adjustable.

Figure 21:
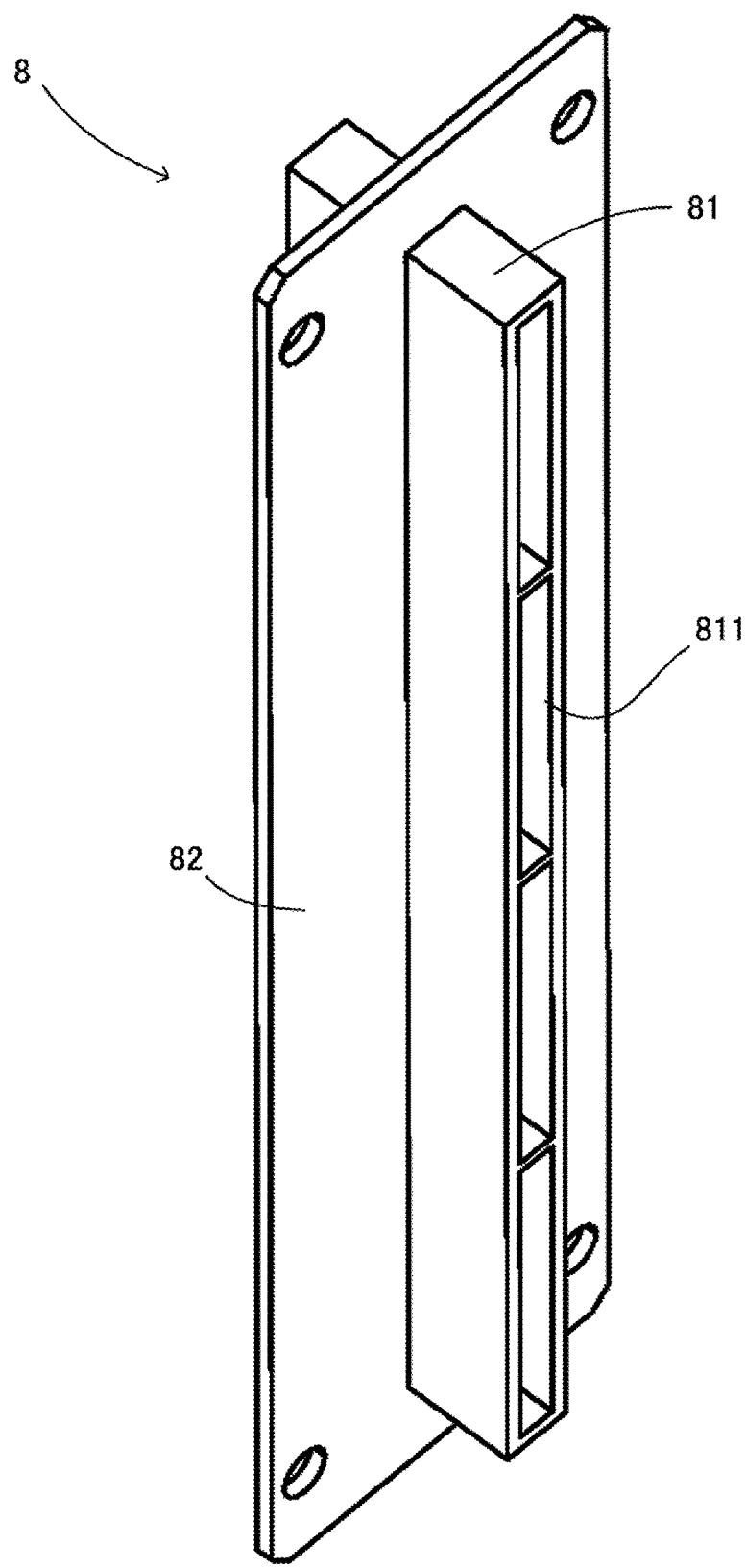
FIG. 21 is a perspective view of a side nozzle.

The side nozzle 8 generates a stream of the inert gas in the direction from the front to the back on the left and right sides inside the chamber 10. The stream of the inert gas formed on the left and right sides transfers the fume that may stay in the left and right spaces in the chamber 10 toward the back and prevents backflow of the inert gas. The side nozzle 8 is provided on both sides of the opening 111 on the front plate 11 side inside the chamber. More specifically, in the present embodiment, three side nozzles 8 are provided on the left side of the opening 111, three side nozzles 8 are provided on the right side of the opening 111, and each side nozzle 8 is attached to the frame 110 of the front plate 11. As shown in FIG. 21, each side nozzle 8 includes a side duct 81 and a side support member 82 holding the side duct 81.

The side duct 81 is a tubular member allowing the inert gas to circulate therethrough. A side blowout port 811 that blows out the inert gas is formed on a back side of the side duct 81. The inert gas sent from the inert gas supply device 22 and the fume collector 23 is sent to the side duct 81 via the introduction port of the frame 110 and ejected from the side blowout port 811. The side support member 82 is, for example, a plate-shaped member, holds the side duct 81 and fixes the side duct 81 to the frame 110.

In the present embodiment, a total of six side nozzles 8 are provided, three on each of the left and right sides. However, the number of the side nozzle 8 is not limited as long as the stream can be generated on the left and right sides. In the present embodiment, the side nozzle 8 is attached to the frame 110. However, the side nozzle 8 may be provided in any position on the front plate 11 side inside the chamber 10 so as to sandwich the opening 111. In the present embodiment, the blowout direction of the inert gas from the side blowout port 811 is fixed. However, the blowout direction may be configured to be adjustable.

According to the configuration described above, the streams of the inert gas can be generated flowing in substantially one direction from the front to the back over the entire chamber 10 including the upper space, the middle space, the lower space, and the left and right sides inside the chamber 10. Accordingly, retention of fumes in the chamber 10 can be prevented, and the fumes can be relatively efficiently discharged out of the chamber 10. Thus, since deterioration of quality of the three-dimensional object due to the influence of the fumes can be prevented, and temporary suspension of manufacturing for fume collection can be suppressed, manufacturing time can be shortened. The disclosure is particularly effective in the case where the amount of fume generated per hour is large, for example, in an additive manufacturing apparatus configured to be able to irradiate a plurality of laser beams L or electron beams at the same time.

Since it is necessary to prevent a material from being soared up and scattered by the stream in the lower space, there is a velocity limit for the stream in the lower space. For example, although the average velocity of the stream formed by the lower nozzle 5 in a plan view of the build region R as measured at a position of 50 mm from the build surface depends on the type of the material, the average velocity is desirably, for example, about 2 m/s. In the present embodiment, by configuring the stream in the middle space to be faster than the stream in the lower space, fumes can be relatively suitably discharged while scattering of the material is prevented. That is, the average velocity of the stream of the inert gas formed by the middle nozzle 6 in the plan view of the build region R is desirably configured to be greater than the average velocity of the stream of the inert gas formed by the lower nozzle 5 in the plan view of the build region R.

As having been specifically shown in several examples, the disclosure is not limited to the configurations of the embodiments shown in the drawings, and various modifications or applications are possible without departing from the technical idea of the disclosure. For example, another inert gas supply port or discharge port may be provided in the chamber 10 or a member in the chamber 10 in a range not obstructing the streams generated by the gas supplier 2. For example, the inert gas supply port or discharge port may be provided on a side surface of the recoater head 33. In the present embodiment, two discharge ports 131 are formed in the exhaust duct 130 as the back plate of the chamber 10. However, the position and number of the discharge port 131 are not limited if a stream from the front toward the back can be generated. For example, the discharge port 131 may be formed on the top plate of the chamber 10 on the back side. However, the discharge port 131 is desirably provided at substantially the same height as the middle nozzle 6 from the viewpoint of efficiently discharging the stream in the middle space generated by the middle nozzle 6. In order to facilitate the discharge or circulation of the inert gas, a fan may be provided in the gas discharger 13 or the fume collector 23 or the like.

What is claimed is:

1. An additive manufacturing apparatus comprising:
 a chamber, comprising a front plate on which an opening is formed, and covering a build region being a region where a desired three-dimensional object is formed;
 a door, provided at the opening and configured to be openable and closable;
 an irradiator, provided above the chamber and irradiating a material layer formed in the build region with a laser beam or an electron beam to form a solidified layer;
 a gas supplier, supplying an inert gas to the chamber; and
 a gas discharger, discharging the inert gas from the chamber, wherein
 the gas supplier comprises:
  a middle nozzle, provided so as to cross the opening when the door is closed, and in which a middle blowout port that blows out the inert gas is formed; and
  a lower nozzle, provided below the middle nozzle on a side of the front plate inside the chamber, and in which a lower blowout port that blows out the inert gas is formed, and
 the middle nozzle has one end swingably supported on the front plate, and swings independently of opening and closing of the door.

2. The additive manufacturing apparatus according to claim 1, wherein
 the middle nozzle comprises:
  a middle duct, in which the middle blowout port is formed; and
  a middle support member, holding the middle duct, wherein
 a blowout direction of the inert gas from the middle blowout port is configured to be adjustable.

3. The additive manufacturing apparatus according to claim 2, wherein
 the front plate comprises a frame through which the inert gas circulates, and
 the middle support member comprises:
  a fixed part, fixed to the frame;
  a contact/separate part, configured to be able to contact and be separated from the frame; and
  a passage part, through which the inert gas supplied from the frame via at least one of the fixed part and the contact/separate part circulates, supplying the inert gas to the middle duct.

4. The additive manufacturing apparatus according to claim 2, wherein
 the middle nozzle further comprises a middle louver pivotally supported on the middle duct so as to be swingable from side to side.

5. The additive manufacturing apparatus according to claim 2, wherein
the middle nozzle comprises a middle bracket having a first surface that fixes the middle duct and a second surface that fixes the middle support member,
the first surface of the middle bracket has a journal hole through which a bolt is inserted and an elongated hole through which a bolt is inserted, and
the middle duct is supported so as to be swingable up and down about the journal hole of the middle bracket.

6. The additive manufacturing apparatus according to claim 1, wherein the lower nozzle comprises:
a lower duct, in which the lower blowout port is formed; and
a lower support member, holding the lower duct, wherein a blowout direction of the inert gas from the lower blowout port is configured to be adjustable.

7. The additive manufacturing apparatus according to claim 6, wherein
the lower nozzle further comprises a lower louver pivotally supported on the lower duct so as to be swingable from side to side.

8. The additive manufacturing apparatus according to claim 6, wherein
the lower nozzle comprises a lower bracket having a first surface that fixes the lower duct and a second surface that fixes the lower support member,
the first surface of the lower bracket has a journal hole through which a bolt is inserted and an elongated hole through which a bolt is inserted, and
the lower duct is supported so as to be swingable up and down about the journal hole of the lower bracket.

9. The additive manufacturing apparatus according to claim 1, wherein
the gas supplier further comprises an upper nozzle provided above the middle nozzle on the side of the front plate inside the chamber and in which an upper blowout port that blows out the inert gas is formed.

10. The additive manufacturing apparatus according to claim 9, wherein
the upper nozzle comprises:
a first upper duct, in which the upper blowout port is formed;
a second upper duct, in which the upper blowout port is formed;
a third upper duct, in which the upper blowout port is formed; and
an upper support member, holding the first upper duct, the second upper duct and the third upper duct, wherein
the upper blowout port of the second upper duct and the upper blowout port of the third upper duct are directed further downward than the upper blowout port of the first upper duct.

11. The additive manufacturing apparatus according to claim 1, wherein
the gas supplier further comprises a plurality of side nozzles respectively provided on both sides of the opening on the side of the front plate inside the chamber and in which a side blowout port that blows out the inert gas is formed.

12. The additive manufacturing apparatus according to claim 1, wherein
an average velocity of a stream of the inert gas formed by the middle nozzle in a plan view of the build region is configured to be greater than an average velocity of a stream of the inert gas formed by the lower nozzle in the plan view of the build region.

13. The additive manufacturing apparatus according to claim 1, wherein
the irradiator comprises:
at least one beam source, generating the laser beam or the electron beam; and
a plurality of scanners, scanning the laser beam or the electron beam, and
the irradiator is configured to be able to irradiate a plurality of the laser beams or the electron beams at the same time.

14. The additive manufacturing apparatus according to claim 1, wherein the gas discharger comprises:
an exhaust duct, in which a discharge port discharging the inert gas is formed; and
a current plate, provided in the exhaust duct.

* * * * *